United States Patent
Heap et al.

(10) Patent No.: US 8,214,093 B2
(45) Date of Patent: Jul. 3, 2012

(54) METHOD AND APPARATUS TO PRIORITIZE TRANSMISSION OUTPUT TORQUE AND INPUT ACCELERATION FOR A HYBRID POWERTRAIN SYSTEM

(75) Inventors: Anthony H. Heap, Ann Arbor, MI (US); Lawrence A. Kaminsky, Sterling Heights, MI (US); Jy-Jen F. Sah, West Bloomfield, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 865 days.

(21) Appl. No.: 12/254,875

(22) Filed: Oct. 21, 2008

(65) Prior Publication Data
US 2009/0118915 A1   May 7, 2009

Related U.S. Application Data

(60) Provisional application No. 60/985,281, filed on Nov. 4, 2007.

(51) Int. Cl.
  *G05D 3/00* (2006.01)
  *G05D 1/00* (2006.01)
  *B60K 6/20* (2007.10)
(52) U.S. Cl. ............... 701/22; 701/84; 108/65.21
(58) Field of Classification Search .......... 701/22, 701/35, 208, 211, 213, 300, 84; 180/65.21, 180/65.1–65.8; 340/995.1, 995.19; 903/930
See application file for complete search history.

(56) References Cited

U.S. PATENT DOCUMENTS

| 6,832,148 | B1 | 12/2004 | Bennett |
| 6,868,318 | B1 | 3/2005 | Cawthorne |
| 7,154,236 | B1 | 12/2006 | Heap |
| 2002/0069007 | A1* | 6/2002 | Bidner et al. ............ 701/93 |
| 2005/0022599 | A1* | 2/2005 | Suzuki ............ 73/514.32 |
| 2005/0076958 | A1 | 4/2005 | Foster |
| 2005/0077867 | A1 | 4/2005 | Cawthorne |
| 2005/0077877 | A1 | 4/2005 | Cawthorne |
| 2005/0080523 | A1 | 4/2005 | Bennett |
| 2005/0080527 | A1 | 4/2005 | Tao |
| 2005/0080535 | A1 | 4/2005 | Steinmetz |
| 2005/0080537 | A1 | 4/2005 | Cawthorne |
| 2005/0080538 | A1 | 4/2005 | Hubbard |
| 2005/0080539 | A1 | 4/2005 | Hubbard |
| 2005/0080540 | A1 | 4/2005 | Steinmetz |
| 2005/0080541 | A1 | 4/2005 | Sah |
| 2005/0182526 | A1 | 8/2005 | Hubbard |
| 2005/0182543 | A1 | 8/2005 | Sah |

(Continued)

FOREIGN PATENT DOCUMENTS

EP   1 262 684 A1   12/2002

(Continued)

*Primary Examiner* — James Trammell
*Assistant Examiner* — Muhammad Shafi

(57) ABSTRACT

A powertrain includes an electro-mechanical transmission mechanically-operatively coupled to an internal combustion engine and an electric machine adapted to selectively transmit mechanical power to an output member. A method for controlling the powertrain includes operating the transmission in an operating range state wherein input speed can operate independent of output speed and wherein a reactive torque is transmitted through the transmission. The method further includes monitoring commands affecting a requested output torque, monitoring a calculated output torque, and prioritizing between an input acceleration of the transmission and an output torque of the transmission based upon whether operating the transmission in the operating range state is in transient operation or stable operation.

13 Claims, 13 Drawing Sheets

U.S. PATENT DOCUMENTS

| | | |
|---|---|---|
| 2005/0182546 A1 | 8/2005 | Hsieh |
| 2005/0182547 A1 | 8/2005 | Sah |
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194566 A1* | 8/2006 | Oesterling ................. 455/404.1 |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Heap |
| 2009/0118925 A1 | 5/2009 | Hsieh |
| 2009/0118926 A1 | 5/2009 | Heap |
| 2009/0118927 A1 | 5/2009 | Heap |

| | | |
|---|---|---|
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |
| 2009/0118939 A1 | 5/2009 | Heap |
| 2009/0118940 A1 | 5/2009 | Heap |
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118950 A1 | 5/2009 | Heap |
| 2009/0118951 A1 | 5/2009 | Heap |
| 2009/0118952 A1 | 5/2009 | Heap |
| 2009/0118954 A1 | 5/2009 | Wu |
| 2009/0118957 A1 | 5/2009 | Heap |
| 2009/0118962 A1 | 5/2009 | Heap |
| 2009/0118963 A1 | 5/2009 | Heap |
| 2009/0118964 A1 | 5/2009 | Snyder |
| 2009/0118969 A1 | 5/2009 | Heap |
| 2009/0118971 A1 | 5/2009 | Heap |
| 2009/0118999 A1 | 5/2009 | Heap |
| 2009/0144002 A1 | 6/2009 | Zettel |
| 2010/0041511 A1 * | 2/2010 | Tabata et al. .................. 477/3 |

FOREIGN PATENT DOCUMENTS

WO    WO-2006-137586    * 12/2006

* cited by examiner

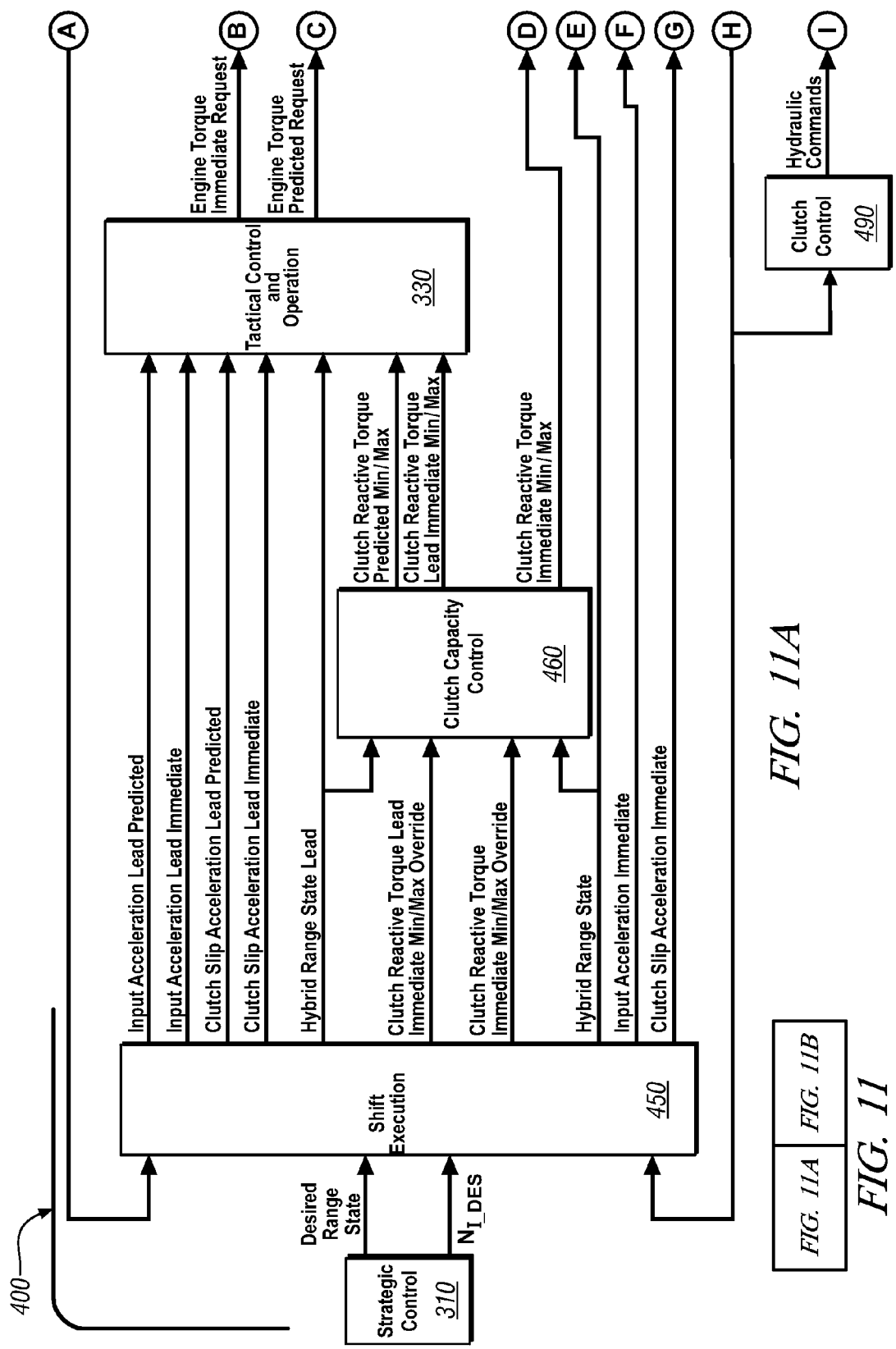

METHOD AND APPARATUS TO PRIORITIZE TRANSMISSION OUTPUT TORQUE AND INPUT ACCELERATION FOR A HYBRID POWERTRAIN SYSTEM

CROSS REFERENCE TO RELATED APPLICATIONS

This application claims the benefit of U.S. Provisional Application No. 60/985,281 filed on Nov. 4, 2007 which is hereby incorporated herein by reference.

TECHNICAL FIELD

This disclosure pertains to control systems for electro-mechanical transmissions.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electro-mechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate an input torque to the transmission, independently of an input torque from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating range state and gear shifting, controlling the torque-generative devices, and regulating the electrical power interchange among the electrical energy storage device and the electric machines to manage outputs of the transmission, including torque and rotational speed.

Transmissions within a hybrid powertrain, as described above, serve a number of functions by transmitting and manipulating torque in order to provide torque to an output member. In order to serve the particular function required, the transmission selects between a number of operating range states or configurations internal to the transmission defining the transfer of torque through the transmission. Known transmissions utilize operating range states including fixed gear states or states with a defined gear ratio. For example, a transmission can utilize four sequentially arranged fixed gear states and allow selection between the four gear states in order to provide output torque through a wide range of output member speeds. Additively or alternatively, known transmissions also allow for continuously variable operating range states or mode states, enabled for instance through the use of a planetary gear set, wherein the gear ratio provided by the transmission can be varied across a range in order to modulate the output speed and output torque provided by a particular set of inputs. Additionally, transmissions can operate in a neutral state, ceasing all torque from being transmitted through the transmission. Additionally, transmissions can operate in a reverse mode, accepting input torque in a particular rotational direction used for normal forward operation and reversing the direction of rotation of the output member. Through selection of different operating range states, transmissions can provide a range of outputs for a given input.

Operation of the above devices within a hybrid powertrain vehicle require management of numerous torque bearing shafts or devices representing connections to the above mentioned engine, electrical machines, and driveline. Input torque from the engine and input torque from the electric machine or electric machines can be applied individually or cooperatively to provide output torque. However, changes in output torque required from the transmission, for instance, due to a change in operator pedal position or due to an operating range state shift, must be handled smoothly. Particularly difficult to manage are input torques, applied simultaneously to a transmission, with different reaction times to a control input. Based upon a single control input, the various devices can change respective input torques at different times, causing increased abrupt changes to the overall torque applied through the transmission. Abrupt or uncoordinated changes to the various input torques applied to a transmission can cause a perceptible change in acceleration or jerk in the vehicle, which can adversely affect vehicle drivability.

Various control schemes and operational connections between the various aforementioned components of the hybrid drive system are known, and the control system must be able to engage to and disengage the various components from the transmission in order to perform the functions of the hybrid powertrain system. Engagement and disengagement are known to be accomplished within the transmission by employing selectively operable clutches. Clutches are devices well known in the art for engaging and disengaging shafts including the management of rotational velocity and torque differences between the shafts. Engagement or locking, disengagement or unlocking, operation while engaged or locked operation, and operation while disengaged or unlocked operation are all clutch states that must be managed in order for the vehicle to operate properly and smoothly.

Clutches are known in a variety of designs and control methods. One known type of clutch is a mechanical clutch operating by separating or joining two connective surfaces, for instance, clutch plates, operating, when joined, to apply frictional torque to each other. One control method for operating such a mechanical clutch includes applying a hydraulic control system implementing fluidic pressures transmitted through hydraulic lines to exert or release clamping force between the two connective surfaces. Operated thusly, the clutch is not operated in a binary manner, but rather is capable of a range of engagement states, from fully disengaged, to synchronized but not engaged, to engaged but with only minimal clamping force, to engaged with some maximum clamping force. Clamping force applied to the clutch determines how much reactive torque the clutch can carry before the clutch slips. Variable control of clutches through modulation of clamping force allows for transition between locked and unlocked states and further allows for managing slip in a locked transmission. In addition, the maximum clamping force capable of being applied by the hydraulic lines can also vary with vehicle operating states and can be modulated based upon control strategies.

Clutches are known to be operated asynchronously, designed to accommodate some level of slip in transitions between locked and unlocked states. Other clutches are known to be operated synchronously, designed to match speeds of connective surfaces or synchronize before the connective surfaces are clamped together. This disclosure deals primarily with synchronous clutches.

Slip, or relative rotational movement between the connective surfaces of the clutch when the clutch connective surfaces are intended to be synchronized and locked, occurs whenever reactive torque applied to the clutch exceeds actual torque capacity created by applied clamping force. Slip in a transmission results in unintended loss of torque control within the transmission, results in loss of engine speed control and electric machine speed control caused by a sudden change in back-torque from the transmission, and results in sudden changes to vehicle acceleration, creating adverse affects to drivability.

Transmissions can operate with a single clutch transmitting reactive torque between inputs and an output. Transmission can operate with a plurality of clutches transmitting reactive torque between inputs and an output. Selection of operating range state depends upon the selective engagement of clutches, with different allowable combinations resulting in different operating range states.

Output torque and control of input speed through input acceleration are important properties of powertrain operation. In instances where these properties conflict, a method to balance or prioritize control of the powertrain between these properties, in particular depending upon a condition of stable or transient powertrain operation, would be beneficial.

SUMMARY

A powertrain includes an electro-mechanical transmission mechanically-operatively coupled to an internal combustion engine and an electric machine adapted to selectively transmit mechanical power to an output member. A method for controlling the powertrain includes operating the transmission in an operating range state wherein input speed can operate independent of output speed and wherein a reactive torque is transmitted through the transmission. The method further includes monitoring commands affecting a requested output torque, monitoring a calculated output torque, and prioritizing between an input acceleration of the transmission and an output torque of the transmission based upon whether operating the transmission in the operating range state is in transient operation or stable operation.

BRIEF DESCRIPTION OF THE DRAWINGS

One or more embodiments will now be described, by way of example, with reference to the accompanying drawings, in which:

FIG. 5 is a graphical representation of torque terms associated with a clutch through an exemplary transitional unlocking state, in accordance with the present disclosure;

FIG. 6 is a graphical representation of torque terms associated with a clutch through an exemplary transitional locking state, in accordance with the present disclosure;

FIG. 7 is a graphical representation of terms describing an exemplary inertia speed phase of a transmission, in accordance with the present disclosure;

DETAILED DESCRIPTION

Figure 1:
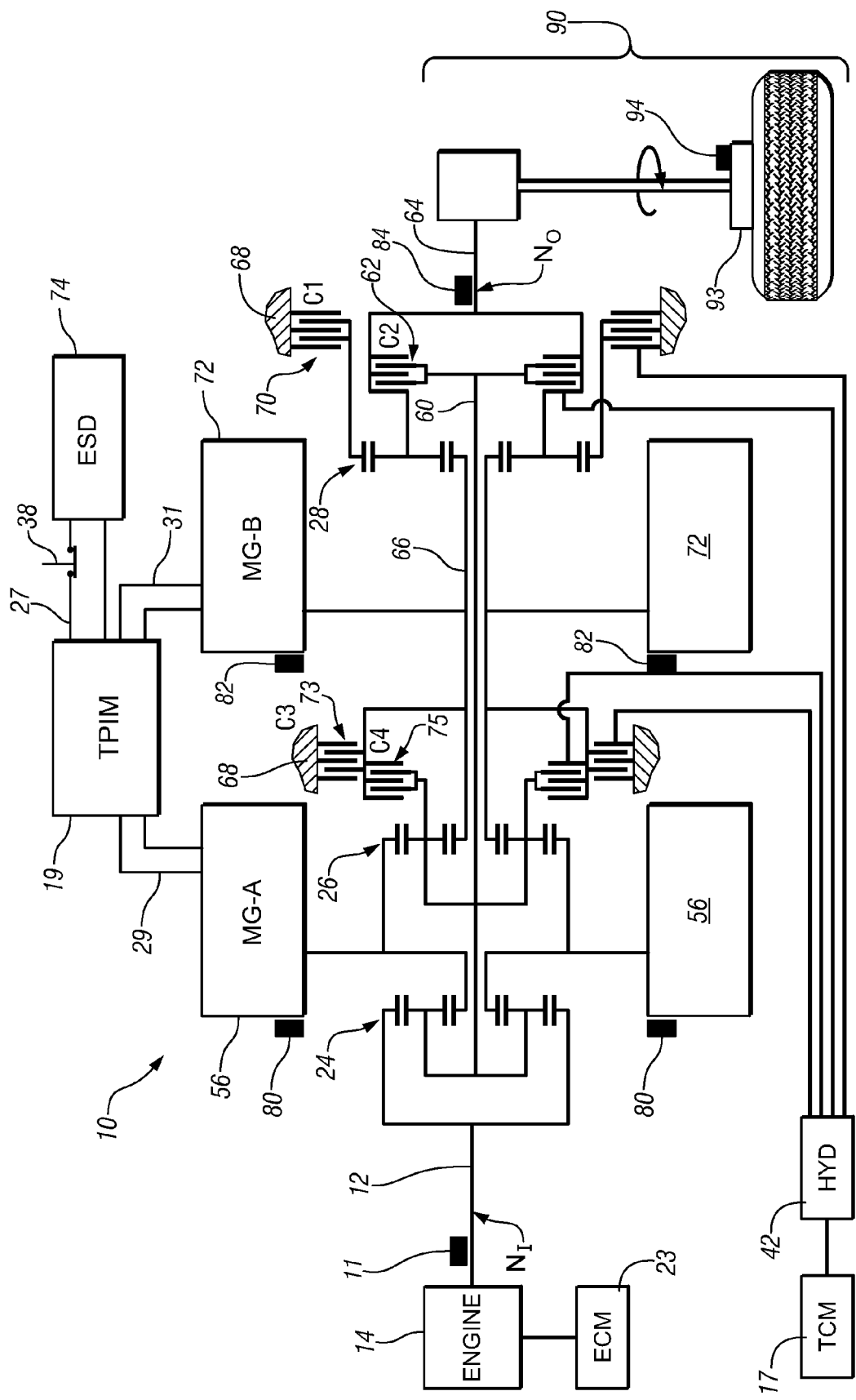
FIG. 1 is a schematic diagram of an exemplary powertrain comprising a two-mode, compound-split, electro-mechanical hybrid transmission operatively connected to an engine and first and second electric machines, in accordance with the present disclosure.
Figure 2:
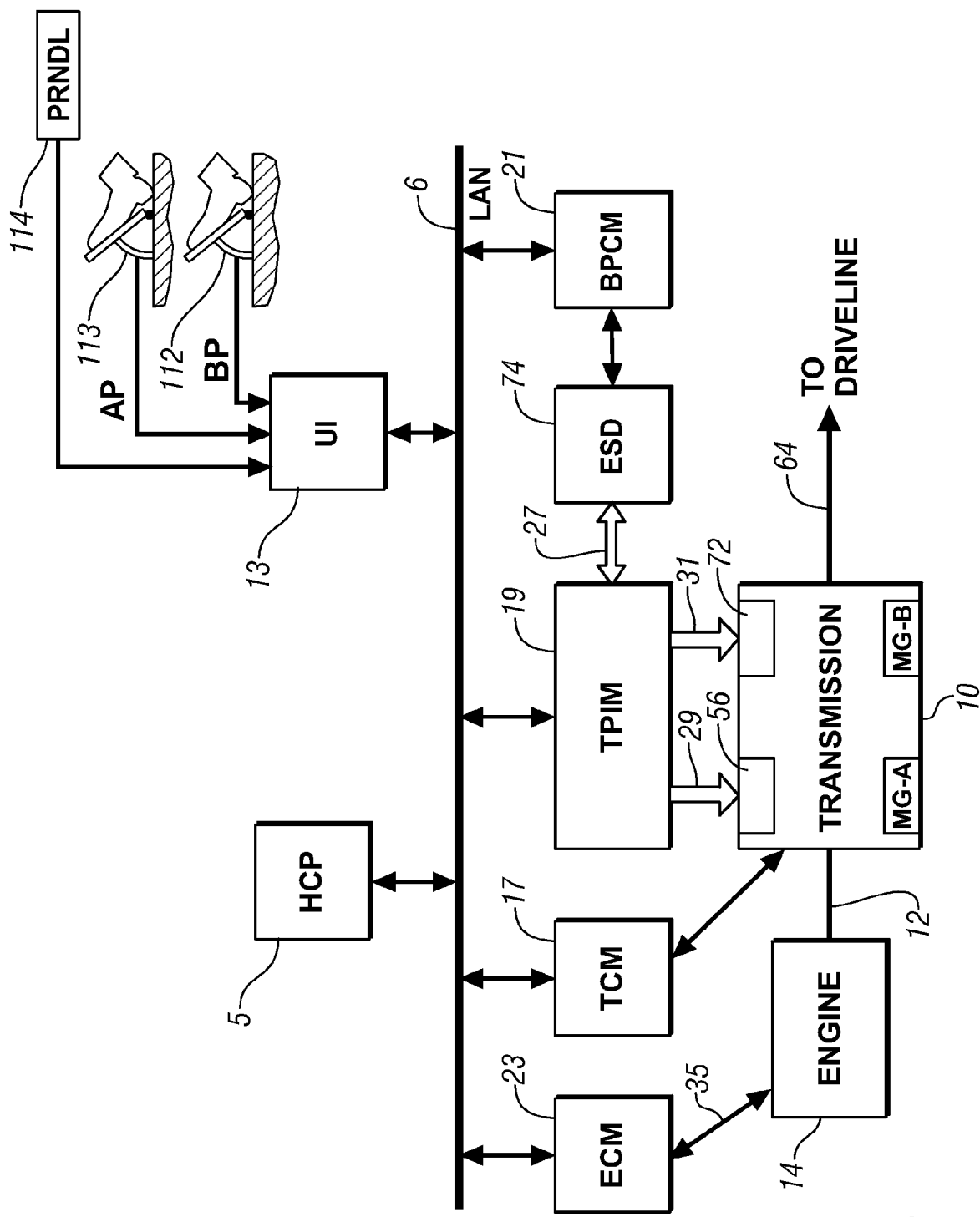
FIG. 2 is a schematic block diagram of an exemplary distributed control module system, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electro-mechanical hybrid powertrain in accordance with the present disclosure is depicted in FIG. 1, comprising a two-mode, compound-split, electro-mechanical hybrid transmission 10 operatively connected to an engine 14 and first and second electric machines ('MG-A') 56 and ('MG-B') 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transmit torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and output torque, can differ from the input speed, $N_I$, and the input torque, $T_I$, to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power, e.g., to vehicle wheels 93, one of which is shown in FIG. 1. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS-WHL}$, the output of which is monitored by a control module of a distributed control module system described with respect to FIG. 2, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque requests to the first and second electric machines 56 and 72 to achieve the input torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary powertrain described in FIG. 1. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electro-mechanical hybrid powertrain. The devices include an accelerator pedal 113 ('AP') from which an operator torque request is determined, an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the operator torque request ('$T_{O\_REQ}$'), a commanded output torque ('$T_{CMD}$') to the driveline 90, an engine input torque request, clutch torques for the torque-transfer clutches C1 70, C2 62, C3 73, C4 75 of the transmission 10; and the torque requests for the first and second electric machines 56 and 72, respectively. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque request from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

Each of the control modules ECM 23, TCM 17, TPIM 19 and BPCM 21 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the powertrain. Alternatively, algorithms may be executed in response to the occurrence of an event.

The exemplary powertrain selectively operates in one of several operating range states that can be described in terms of an engine state comprising one of an engine on state ('ON') and an engine off state ('OFF'), and a transmission state comprising a plurality of fixed gears and continuously variable operating modes, described with reference to Table 1, below.

TABLE 1

| Description | Engine State | Transmission Operating Range State | Applied Clutches | |
|---|---|---|---|---|
| MI_Eng_Off | OFF | EVT Mode 1 | C1 70 | |
| MI_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| MII_Eng_Off | OFF | EVT Mode 2 | C2 62 | |
| MII_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$, is achieved. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine the commanded output torque, $T_{CMD}$, intended to meet the operator torque request, $T_{O\_REQ}$, to be executed at the output member 64 and transmitted to the driveline 90. Final vehicle acceleration is affected by other factors including, e.g., road load, road grade, and vehicle mass. The operating range state is determined for the transmission 10 based upon a variety of operating characteristics of the powertrain. This includes the operator torque request, communicated through the accelerator pedal 113 and brake pedal 112 to the user interface 13 as previously described. The operating range state may be predicated on a powertrain torque demand caused by a command to operate the first and second electric machines 56 and 72 in an electrical energy generating mode or in a torque generating mode. The operating range state can be determined by an optimization algorithm or routine, initiated for example within a hybrid strategic control module of the HCP 5, which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required to achieve the desired output torque to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transmit power therebetween to generate a power flow to the output member 64.

As discussed above, managing output torque in order to maintain drivability is a priority in controlling a hybrid powertrain. Any change in torque in response to a change in output torque request applied through the transmission results in a change to the output torque applied to the driveline, thereby resulting in a change in propelling force to the vehicle and a change in vehicle acceleration. The change in torque request can come from operator input, such a pedal position relating an operator torque request, automatic control changes in the vehicle, such as cruise control or other control strategy, or engine changes in response to environmental conditions, such as a vehicle experiencing an uphill or downhill grade. By controlling changes to various input torques applied to a transmission within a hybrid powertrain, abrupt changes in vehicle acceleration can be controlled and minimized in order to reduce adverse effects to drivability.

As is known by one having ordinary skill in the art, any control system includes a reaction time. Changes to a powertrain operating point, comprising the speeds and torques of the various components to the powertrain required to achieve the desired vehicle operation, are driven by changes in control signals. These control signal changes act upon the various components to the powertrain and create reactions in each according to their respective reaction times. Applied to a hybrid powertrain, any change in control signals indicating a new torque request, for instance, as driven by a change in operator torque request or as required to execute a transmission shift, creates reactions in each affected torque generating device in order to execute the required changes to respective input torques. Changes to input torque supplied from an engine are controlled by an engine torque request setting the torque generated by the engine, as controlled, for example, through an ECM. Reaction time within an engine to changes in torque request to an engine is impacted by a number of factors well known in the art, and the particulars of a change to engine operation depend heavily on the particulars of the engine employed and the mode or modes of combustion being utilized. In many circumstances, the reaction time of an engine to changes in torque request will be the longest reaction time of the components to the hybrid drive system. Reaction time within an electric machine to changes in torque request include time to activate any necessary switches, relays, or other controls and time to energize or de-energize the electric machine with the change in applied electrical power.

Figure 3:
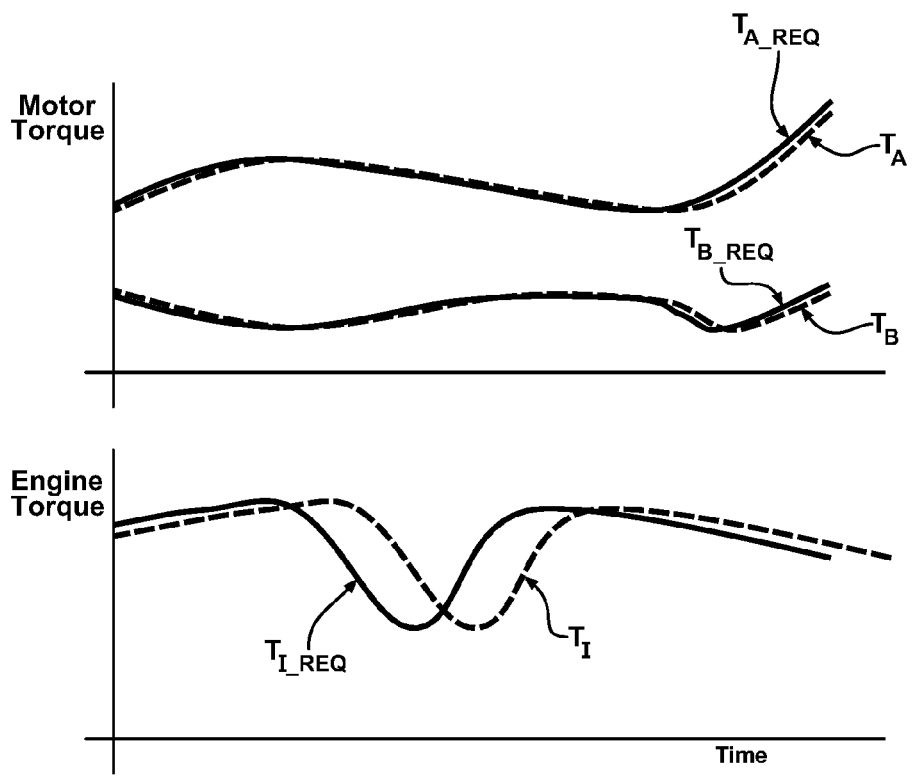
FIG. 3 graphically depicts reaction times of exemplary hybrid powertrain components to changes in torque request, in accordance with the present disclosure.

FIG. 3 graphically depicts reaction times of exemplary hybrid powertrain components to changes in torque request, in accordance with the present disclosure. Components to an exemplary hybrid powertrain system including an engine and two electric machines are exemplified. Torque requests and resulting changes in input torque produced by each torque generating device are illustrated. As described above, the data shows that electric machines quickly respond to changes in torque requests, whereas the engine follows changes in torque requests more slowly.

A method is disclosed wherein reactions times of the engine and of the electric machine or machines within a hybrid powertrain are utilized to control in parallel an lead immediate torque request, controlling the engine, and an immediate torque request, controlling the electric machines, the torque requests being coordinated by respective reaction times in order to substantially effect simultaneous changes to input torque.

Because, as discussed above, changes to input torque from the engine are known to involve consistently longer reactions times than changes to input torque from an electric machine, an exemplary embodiment of the disclosed method can implement changes in torque request to the engine and the electric machine, acting in parallel as described above, including a lead period to the more quickly reacting device, the electric motor. This lead period may be developed experimentally, empirically, predictively, through modeling or other techniques adequate to accurately predict engine and electric machine operation, and a multitude of lead periods might be used by the same hybrid powertrain, depending upon different engine settings, conditions, operating and ranges and vehicle conditions. An exemplary equation that can be used in conjunction with test data or estimates of device reaction times to calculate lead period in accordance with the present disclosure includes the following Eq. 1:

$$T_{Lead} = T_{Lead\ Reaction} - T_{Immediate\ Reaction} \quad [1]$$

wherein $T_{Lead}$ equals the lead period for use in methods described herein. This equation assumes that two torque producing devices are utilized. $T_{Lead\ Reaction}$ represents the reaction time of the device with the longer reaction time, and $T_{Immediate\ Reaction}$ represents the reaction time of the device with the shorter reaction time. If a different system is utilized, comprising for example, an engine with a long lead period, a first electric machine with an intermediate lead period, and a second electric machine with a short lead period, lead periods can be developed comparing all of the torque generating devices. In this exemplary system, if all three torque generating devices are involved, two lead periods, one for the engine as compared to each of the electric machines, will be utilized to synchronize the responses in each of the devices. The same system at a different time might be operating with the engine off and disengaged from the transmission, and a lead period comparing the first electric machine and the second electric machine will be utilized to synchronize the responses in the two electric machines. In this way, a lead period can be developed coordinating reaction times between various torque generating devices can be developed.

One exemplary method to utilize lead periods to implement parallel torque requests to distinct torque generating devices in order to effect substantially simultaneous changes to output torque in response to a change in operator torque request includes issuing substantially immediately a change to the engine torque immediate request, initiating within the engine a change to a new engine output torque. This new engine output torque, in conjunction with the electric motor operating state, is still managed by the HCP in order to provide some portion of the total input torque to the transmission required to propel the vehicle. From the point that the engine torque immediate request changes, the lead period expires, described above taking into account the differences in reaction times between the engine and the electric machine. After the lead period, a change to torque requests issued to the electric machine or machines, managed by the HCP in order to fulfill a portion of the operator torque request, is executed, and the electric machine changes the electric machine operating state, and as described above, the changes to the input torques provided by the engine and the electric machine change substantially simultaneously.

As described in the disclosed method above, engine torque immediate requests and torque requests to an electric machine are disclosed for use in parallel to control distinct torque generative devices with different reaction times to reaction to changes in operator torque request. Changes in operator torque request can include a simple change in desired output torque within a particular transmission operating range state, or changes in operator torque request can be required in conjunction with a transmission shift between different operating range states. Changes to operator torque requests in conjunction with a transmission shift are more complex than changes contained within a single operating range state because torques and shaft speeds of the various hybrid powertrain components must be managed in order to transition torque applied from a first clutch and to a second previously not applied clutch without the occurrence of slip, as described above.

Figure 4:
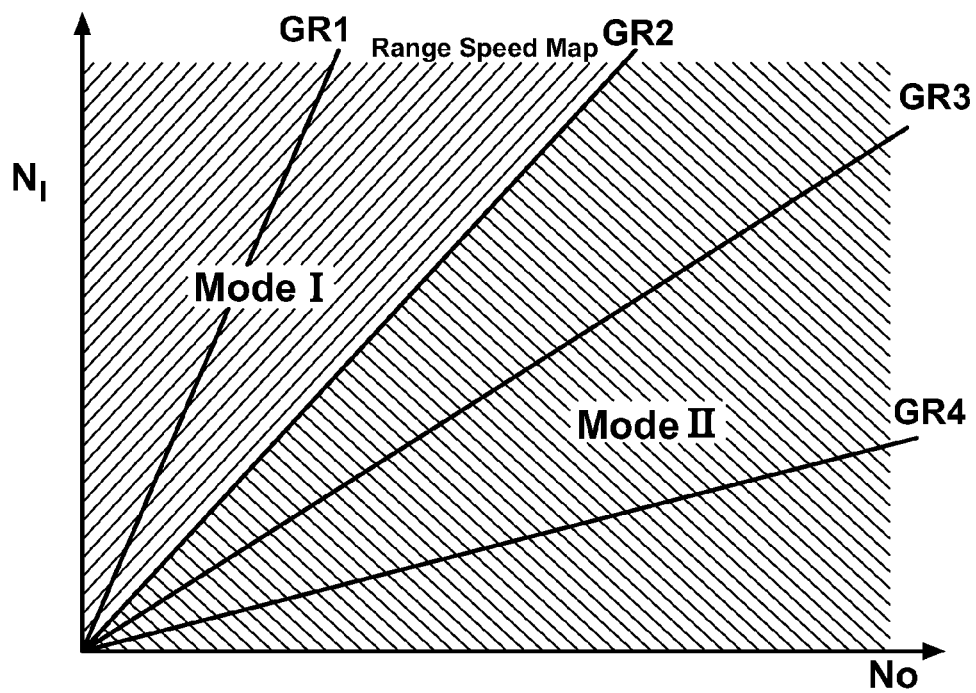
FIG. 4 demonstrates gear transition relationships for an exemplary hybrid powertrain transmission, in accordance with the present disclosure.

Shifts within a transmission, such as the exemplary transmission of FIG. 1, frequently involve unloading a first clutch, transitioning through an inertia speed phase state, and subsequently loading a second clutch. Within the transmission of a conventionally powered vehicle utilizing an engine only, the change within a transmission from one fixed gear state to another fixed gear state frequently includes unloading a first clutch, allowing the vehicle to briefly coast, and then loading a second clutch. However, as described in relation to FIG. 1 and Table 1, above, clutches within a hybrid powertrain transmission are frequently applied in pairs or groups, and a shift within the transmission can involve only unloading one of the applied clutches and subsequently loading another clutch while maintaining engagement of a third clutch throughout the shift. FIG. 4 demonstrates gear transition relationships for an exemplary hybrid powertrain transmission, in particular as described in the exemplary embodiment of FIG. 1 and Table 1, in accordance with the present disclosure. $N_I$ is plotted against $N_O$. At any fixed gear state, $N_O$ is determined by the corresponding $N_I$ along the fixed gear state plots. Operation in either EVT Mode 1 or EVT Mode 2, wherein a continuously variable gear ratio is utilized to power from a fixed input speed can take place in the respective zones illustrated on the graph. Clutch states, C1-C4, as described in the exemplary embodiment of FIG. 1, are described in Table 1. For instance, operation in a second fixed gear state requires clutches C1 and C2 to be applied or loaded and clutches C3 and C4 to be not applied or unloaded. While FIG. 4 describes gear transitions possible in the exemplary powertrain illustrated in FIG. 1, it will be appreciated by one having ordinary skill in the art that such a description of gear transitions is possible for any transmission of a hybrid powertrain, and the disclosure is not intended to be limited to the particular embodiment described herein.

FIG. 4 can describe operation of an exemplary system in a fixed gear state or EVT mode, as described above, and it can also be used to describe shift transitions between the various transmission operating range states. The areas and plots on the graph describe operation of the operating range states through transitions. For example, transitions between fixed gear states within an EVT mode region require transient operation in the EVT mode between the fixed gear states. Similarly, transition from EVT Mode 1 to EVT Mode 2 requires a transition through the second fixed gear state, located at the boundary between the two modes.

In accordance with FIGS. 1 and 4 and Table 1, an exemplary transmission shift from a third fixed gear state to a fourth fixed gear state is further described. Referring to FIG. 4, both the beginning and the preferred operating range states exist within the area of EVT Mode 2. Therefore, a transition from the third gear state to the fourth gear state requires first a shift from the third fixed gear state to EVT Mode 2 and then a shift from EVT Mode 2 to the fourth fixed gear state. Referring to Table 1, a hybrid powertrain transmission, beginning in a third fixed gear state, will have clutches C2 and C4 applied. Table 1 further describes operation in EVT Mode 2, the destination of the first shift, to include clutch C2 applied. Therefore, a shift from the third fixed gear state to EVT Mode 2 requires clutch C4 to be changed from an applied to a not applied state and requires that clutch C2 remain applied. Additionally, Table 1 describes operation in the fourth fixed gear mode, the destination of the second shift, wherein clutches C2 and C3 are applied. Therefore, a shift from EVT Mode 2 to the fourth fixed gear state requires clutch C3 to be applied and loaded and requires that clutch C2 remain applied. Therefore, clutches C4 and C3 are transitioned through the exemplary shift, while clutch C2 remains applied and transmitting torque to the driveline throughout the shift event.

Applied to the methods disclosed herein, changes in input torque through a transmission shift can be adjusted to reduce negative effects to drivability by coordinating signal commands to various torque generative devices based upon reaction times of the various components. As described above, many transmission shifts can be broken down into three phases: a first torque phase, during which an initially applied clutch is changed from a torque-bearing, locked, and synchronized clutch state to an unlocked and desynchronized clutch state; an inertia speed phase, during which affected clutches are unlocked and in transitional states; and a second torque phase, during which a second previously not applied clutch is changed from an unlocked and desynchronized clutch state to a torque-bearing, locked, and synchronized clutch state. As aforementioned, clutch slip is preferably avoided throughout transmission shifts to avoid adverse effects on drivability, and clutch slip is created when reactive torque applied across a clutch exceeds the actual torque capacity of the clutch. Therefore, within a transmission shift event, input torques must be managed in relation to the actual torque capacity of the currently applied clutch, such that the transmission shift can be accomplished without the occurrence of slip.

Figure 5:
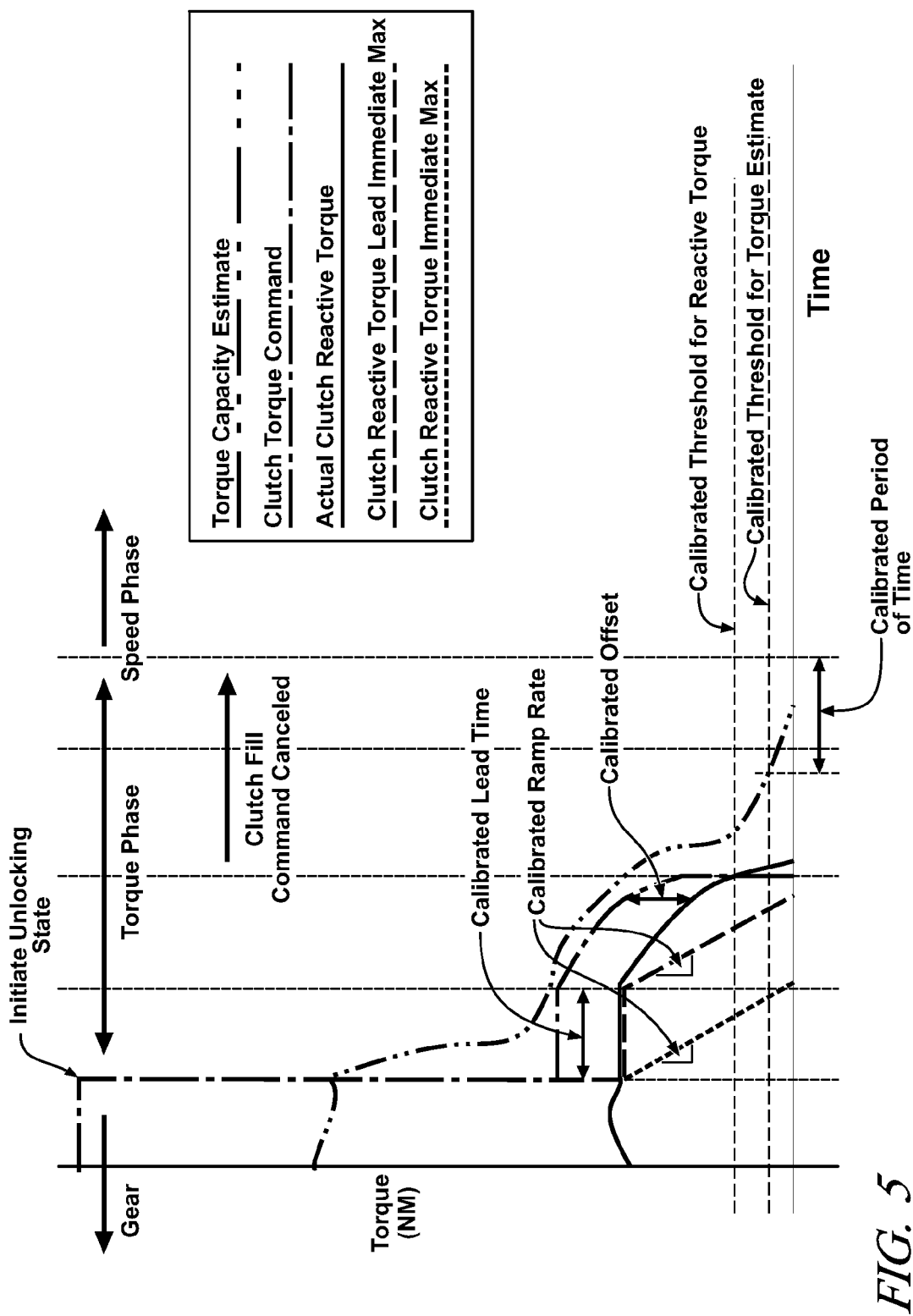
FIGS. 5-7 depict exemplary processes combining to accomplish an exemplary transmission shift, in accordance with the present disclosure.
Figure 6:
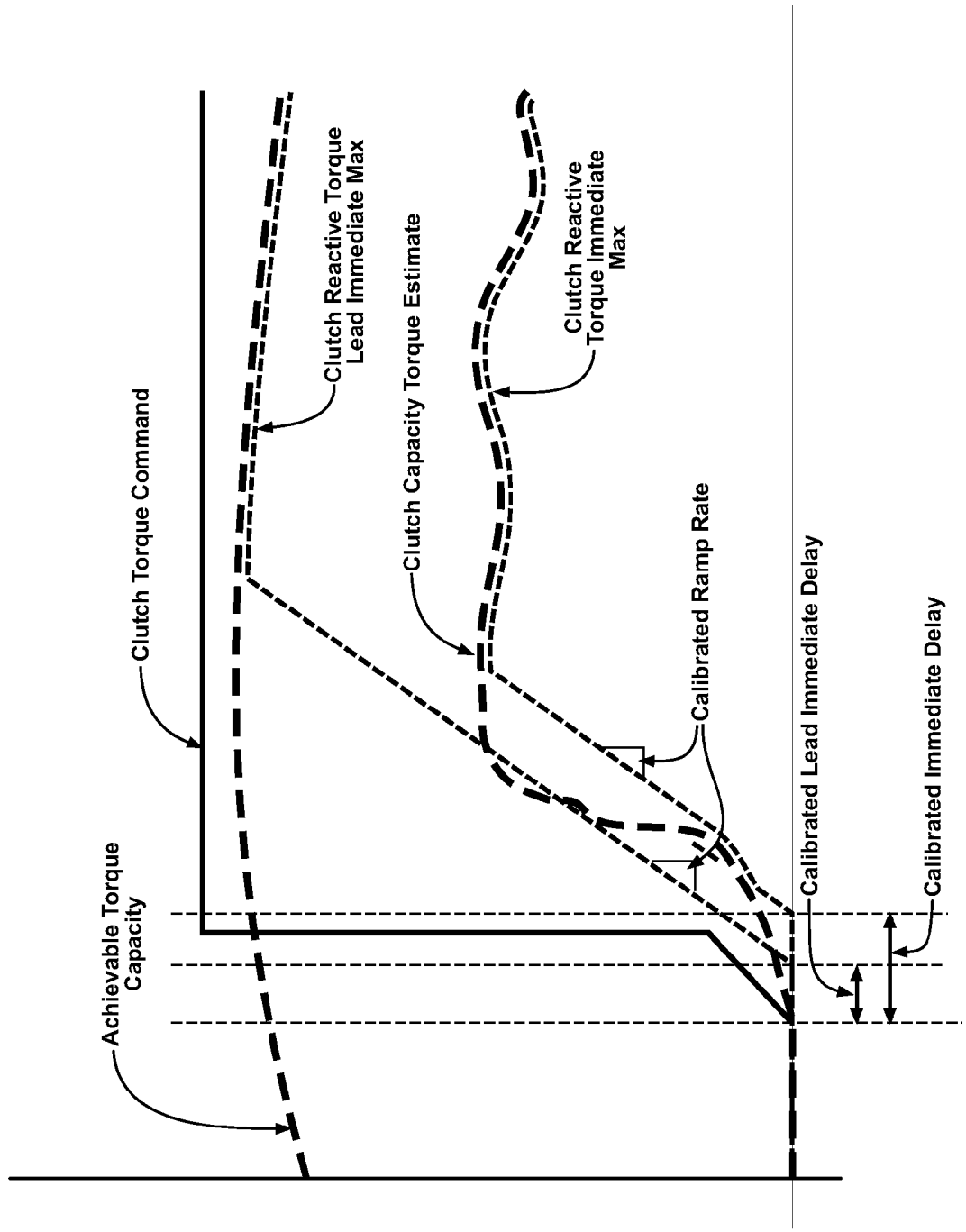
Figures 7, 8:
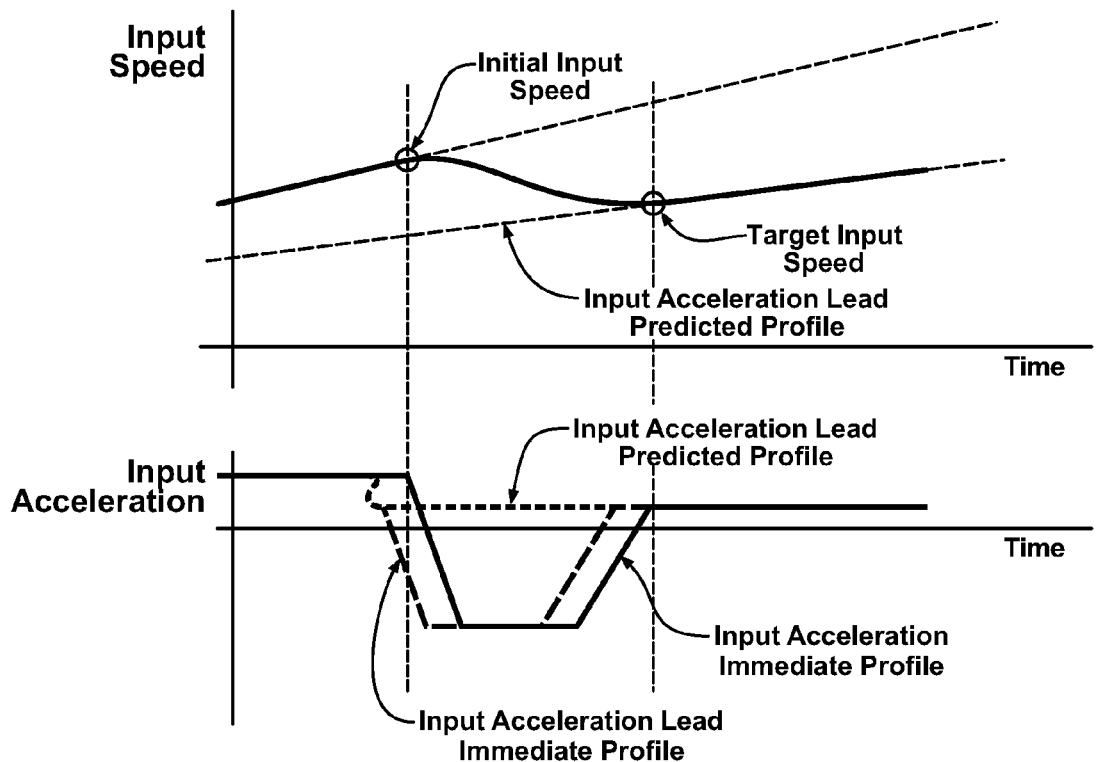
FIG. 8 illustrates in tabular form use of an exemplary 2D look-up table to determine inertia speed phase times, in accordance with the present disclosure.

While a process can be utilized to perform necessary steps in a clutch loading or unloading event in sequence, with the torque capacity of the clutch being maintained in excess of reactive torques, time involved in an unlocking transition is also important to drivability. Therefore, it is advantageous to perform associated torque requests and clutch capacity commands in parallel while still acting to prevent slip. Such parallel implementation of control changes intending to effect clutch state changes associated with a transmission shift preferably occur in as short of a time-span as possible. Therefore, coordination of torque capacity within the clutches involved in the transmission shift to the torque requests, both to the engine and to the electric machine, as described in the exemplary embodiment above, is also important to maintaining drivability through a transmission shift. FIGS. 5-7 depict exemplary processes combining to accomplish an exemplary transmission shift, in accordance with the present disclosure.

FIG. 5 is a graphical representation of torque terms associated with a clutch through an exemplary transitional unlocking state, in accordance with the present disclosure. Lines illustrated at the left extreme of the graph depict clutch operation in a locked state. The graph depicts clutch command torque by a clutch control system and a resulting estimated torque capacity. Clutch torque capacity in a clutch resulting from a command torque is a result of many factors, including available clamping pressure, design and conditional factors of the clutch, reaction time in the clutch to changes in the clutch control system. As demonstrated in the exemplary data of the graph in the initial locked region, it is known to command a torque to a locked clutch in excess of the clutch capacity and allow the other factors affecting the clutch to determine the resulting clutch capacity. Also at the left extreme of the graph depicting clutch operation in a locked state, estimated reactive torque applied to the clutch as a result of input torque from the engine and electric machine torques is depicted. At the time labeled "Initiate Unlocking State", logic within the clutch control system or the TCM, having determined a need to transition the clutch from locked to unlocked states, changes the command torque to some level lower than the torque capacity but still higher than the reactive torque currently applied to the clutch. At this point, mechanisms within the clutch control system, for example, variable pressure control solenoids within an exemplary hydraulic clutch control system, change settings to modulate the clamping force within the clutch. As a result, torque capacity of the clutch begins to change as the clamping force applied to the clutch changes. As discussed above, the clutch reacts to a change in command torque over a reaction time, and reaction time for a particular clutch will depend upon the particulars of the application. In the exemplary graph of FIG. 5, torque capacity reacts to a reduction in command torque and begins to reduce accordingly.

As mentioned above, during the same unlocking state, reactive torque resulting from input torque and electric machine torques must also be unloaded from the clutch. Undesirable slip results if the reactive torque is not maintained below the torque capacity throughout the unlocking state. Upon initiation of the unlocking state, at substantially the same point on FIG. 5 where the torque capacity is reduced to initiate the unlocking state, limits are initiated and imposed upon input torques from the engine and the electric machine in order to accomplish a ramping down of each to zero. As described in the method disclosed herein and in exemplary embodiments described above, changes to limits including a engine torque immediate request and an immediate torque request are executed in a coordinated process, implementing a lead period calibrated to the reaction times of the various torque providing devices, such that the resulting input torques from the devices are reduced substantially simultaneously. FIG. 5 illustrates a method to perform this coordinated change to torque requests by imposing limits upon torque requests in the form of a clutch reactive torque lead immediate min/max constraining the engine torque immediate request and a clutch reactive torque immediate min/max constraining the torque request to the electric machine. These maximum reactive torque values represent the maximum torque that is permitted to be commanded from each torque providing device: the actual engine torque immediate request and the actual immediate torque request can be less than the maximum reactive torque values, but as the maximum values reduce, so the actual torque request values will also eventually reduce. The input torques from the engine and electric machine together provide, each up to the defined maximum values, some portion of the overall input torques, with the portion of each being controlled by the HCP. As a result of the calibrated lead period, both the clutch reactive torque lead immediate min/max and the clutch reactive torque immediate min/max reduce applied reactive torque to the clutch at substantially the same time, resulting in the reduction to the actual clutch reactive torque as illustrated in FIG. 5. As will be appreciated by one having ordinary skill in the art, other safeguards will additionally need to be utilized to ensure that the torque capacity remains in excess of the reactive torque throughout the unloading process. Many such methods are contemplated, and an exemplary set of terms which might be used are depicted on FIG. 5. For instance, a calibrated offset term can be used to ensure that the command setting the clutch capacity remains in excess of the actual clutch reactive torque until the actual torque passes below some threshold. An exemplary threshold for such a purpose is defined in FIG. 5 as the calibrated threshold for reactive torque. In maintaining this torque capacity request above the actual clutch reactive torque, and remembering that all devices include a reaction time to request changes, including the clutch clamping mechanism, the delay in the change to torque capacity in response to clutch command changes in combination with this offset term will maintain the torque capacity in excess of the actual clutch reactive torque. Additionally, another threshold, a calibrated threshold for torque estimate, can be used to define the end of the torque phase. For instance, if an estimate of the clutch torque capacity, as determined by an algorithm modeling clutch operation, stays below this threshold through a calibrated period of time, then the clutch can be determined to be in an unlocked state.

FIG. 6 is a graphical representation of torque terms associated with a clutch through an exemplary transitional locking state, in accordance with the present disclosure. As described above, within many transmission shift events, a second clutch is synchronized and locked, and torque is applied to the clutch. Lines illustrated at the left extreme of the graph depict clutch operation in an unlocked state. The initiation of locking state requires a series of subordinate commands necessary to transition the clutch from an unlocked state to a locked state. As described above in relation to a transition to a second torque phase within a transmission shift, the clutch, including the shaft connected to the oncoming torque providing shafts and the shaft connected to the output member, must be synchronized. Once the clutch connective surfaces attached to these shafts have been attenuated and are moving at the same rotational velocity, clamping force can begin to be applied to the clutch to bring the clutch to a locked state and begin increasing the torque capacity of the clutch. As described above with regards to avoiding slip during a torque phase, clutch capacity must be increased before reactive torque to the clutch can be increased. In order to enable the application of input torques resulting in a reactive torque across the clutch as rapidly as possible, an increase in clutch capacity can be commanded anticipatorily to achieve an initial increase in clutch capacity coincident with the clutch reaching a locked state. Reactive torques, taking into account reaction times by utilizing a lead period by the method disclosed herein, can then be timely commanded with a short lag to follow increasing clutch torque capacity. An exemplary embodiment of this method, acting in reverse of the limits imposed to torque requests as described in FIG. 5, imposes limits upon the torque requests which can be issued to the engine and to the electric machine according to a calibrated ramp rate, selected to avoid slip. As depicted in FIG. 6, a clutch reactive torque immediate min/max acting as a constraint upon electric machine torque requests is increased after a calibrated lead period from the initiation of an increasing clutch reactive torque lead immediate min/max acting as a constraint upon engine torque requests. By utilizing the lead period, the increase in input torques from the engine and the electric machine increase reactive torque applied to the clutch substantially simultaneously, according to the methods disclosed herein. As the limits upon the torque generating devices are lifted according to the calibrated ramp rate applied to each limit, the HCP can command the engine and the electric machine to fulfill a portion of the reactive torque required from the clutch, each up to the respective maximum. In this way, torque requests to the engine and the electric machine are coordinated in order to compensate for reaction times in order to increase input torques from each substantially simultaneously through a shift event.

The calibrated ramp rate utilized in the above exemplary transmission shift is a selected value which will adjust input torque levels to the desired range quickly, but also will stay below the torque capacity for the clutch so as to avoid slip. The ramp rate may be developed experimentally, empirically, predictively, through modeling or other techniques adequate to accurately predict engine and electric machine operation, and a multitude of ramp rates might be used by the same hybrid powertrain, depending upon different engine settings, conditions, or operating ranges and behavior of the control system actuating the clutch torque capacity. The ramp rate used to decrease input torques in an unlocking event can but need not be an inverse of the ramp rate used to increase input torques in a locking event. Similarly, the lead period used to coordinate input torques can but need not be the same time span value utilized in both transmission transitional states and can be varied according to particular behaviors of a vehicle and its components.

As described above, during a transmission shift, for example, between two fixed gear states as defined in the exemplary transmission described above, the transmission passes through an inertia speed phase between a first torque phase and a second torque phase. During this inertia speed phase, the originally applied clutch and the clutch to be applied are in an unlocked state, and the input is initially spinning with a rotational velocity that was shared across the first clutch just prior to becoming unsynchronized. In order to accomplish synchronization within the second clutch to be applied and loaded in the second torque phase, inputs to be connected to the second clutch must change $N_I$ to match the driveline attached through the transmission at some new gear ratio. A number of methods are known in the art to accomplish this synchronization. However, within a shift in a hybrid powertrain transmission, shifts usually occur through range operating state where at least one clutch is still applied while another clutch is in an inertia speed phase. This means that changes to the various torque generative devices required to create synchronization in the input speed and output speed of the second clutch still impact vehicle performance in the inertia speed phase through the still applied clutch. Therefore, the methods described herein to utilize a lead period to effect changes to input torques substantially simultaneously can additionally present advantages to drivability can continue to be utilized through an inertia speed phase.

An exemplary method to accomplish this synchronization through an inertia speed phase of a transmission shift is graphically depicted in FIG. 7, in accordance with the present disclosure. The effects of the transmission shift upon two terms descriptive of the shifting process are illustrated in two sections with a common timescale. The top section depicts $N_I$, initially connected through the first, initially applied clutch. The upper dotted line represents the velocity profile of $N_I$ while the first clutch is in a locked state before initiation of the shift. The bottom dotted line represents the velocity profile of $N_I$ that must be achieved to synchronize the input speed with the output speed of the second clutch. The transition between the two dotted lines represents the change to input speed that must take place to accomplish the shift. The bottom section of FIG. 7 depicts input acceleration ($N_{I\_DOT}$), or a derivative with respect to time of $N_I$. $N_{I\_DOT}$ is described in this case as the input acceleration immediate or the acceleration profile driven with a relatively quick reaction time by an electric machine or machines, and the term closely tracks actual $N_{I\_DOT}$. The input acceleration immediate shows the change in the rate of speed which must be accomplished in order to transition the $N_I$ from an initial $N_I$ at the synchronous state with the first clutch to a target input speed at the synchronous state with the second clutch. The initial flat portion describes the acceleration with which the input speed is increased before the initiation of the shift, and this constant value reflects the slope of the input speed in the left portion of the top section of the FIG. 7. At the time of the initiation of the shift, based upon operator input such as pedal position and algorithms within the transmission control system, including determining a preferred operating range state, a determination is made regarding target input speed that will be required to achieve synchronization and the target input acceleration profile required to accomplish the shift. An input acceleration rate, calculated to support a target acceleration rate after the shift is completed, can be termed an input acceleration lead predicted and describes the $N_{I\_DOT}$ that needs to exist after the inertia speed phase is completed. The input acceleration lead immediate is predicted through an algorithm factoring in operator requested torque, the preferred operating range state being transitioned to, and other relevant variables. Because, as described in the top portion of FIG. 7, $N_I$ must be changed through the inertia speed phase to accomplish the shift and because $N_{I\_DOT}$ describes the rate of change of the $N_I$, the $N_{I\_DOT}$ of the device being controlled during the inertia speed phase must reflect the input speed change to be accomplished through the inertia speed phase. In the exemplary data displayed in FIG. 7, wherein the input speed needs to be reduced to accomplish the transmission shift, the $N_{I\_DOT}$ of the device necessarily must change to a negative value representing the change in $N_I$. Once $N_I$ has been reduced to a level enabling transition to the target input speed needed for synchronizing the input and output speeds, the $N_{I\_DOT}$ changes to match the input acceleration lead predicted. In this way, $N_I$ and $N_{I\_DOT}$ can be controlled through an inertia speed phase to match a target input speed and target input acceleration necessary to achieve a smooth transmission shift.

As described above, a transmission shift in a hybrid powertrain transmission requires transition between operating range states, wherein an inertia speed phase must be accomplished as described above, while at least one clutch is still applied and transferring torque from the torque producing devices to the driveline. Changes to input torques, driven by torque requests to the various torque generating devices, must accomplish both the required $N_I$ and $N_{I\_DOT}$ changes and maintain drivability throughout the inertia speed phase. Therefore, exemplary methods described herein to utilize a lead period to effect changes to input torques substantially simultaneously can be utilized through an inertia speed phase to effect torque request changes to the various torque producing devices in order to effect substantially simultaneous changes to the input torques. FIG. 7 illustrates coordinating torque producing device reaction times, and a lead period calibrated to the difference in the related reaction times, to improve drivability in a transmission shift. An engine, as described above, includes the greater reaction time among torque generating devices. In order to adjust the $N_I$ and $N_{I\_DOT}$ as quickly as possible to achieve the target speed and acceleration values for the shift, an input acceleration lead immediate is predicted through an algorithm. This input acceleration lead immediate includes the reaction time of the engine to changes in torque requests, and profiles the most rapid change in $N_I$ and $N_{I\_DOT}$ in the lead device that can be accomplished to reach the target values. This rapid change in $N_I$ must include the aforementioned reaction time in the engine to changes in torque requests and the time the engine will take to accelerate or decelerate through the input acceleration lead immediate. As depicted in FIG. 7, the input acceleration lead immediate, in anticipation of a pending shift, can initiate requisite commands to the engine in anticipation of the inertia speed phase, as the resulting input torque from the engine will not begin to reduce until later, due to the relatively long engine reaction time. Once the input acceleration lead immediate has been determined, an input acceleration immediate, following the input acceleration lead immediate by a lead period, calibrated to reaction times as described above, can be utilized to control the electric machine to match changes in $N_I$ and $N_{I\_DOT}$ at substantially the same time as the response from the engine. In this way, the engine and the electric machines are substantially synchronized in affecting the target input speed and target acceleration.

The above methods describe torque management processes as a comparison of positive values. It will be appreciated by one having ordinary skill in the art that clutch torques are described as positive and negative torques, signifying torques applied in one rotational direction or the other. The above method can be used in either positive or negative torque applications, where the magnitudes of the torques are modulated in such a way that the magnitude of the applied reactive torque does not exceed the magnitude of the torque capacity for a particular clutch.

An exemplary method to set total desired speed phase time based upon accelerator pedal position and initial input speed delta includes use of a calibrated 2D look-up table. FIG. 8 illustrates in tabular form use of an exemplary 2D look-up table to determine inertia speed phase times, in accordance with the present disclosure. Accelerator pedal position and the initial $N_I$ delta allow projection of a change required in $N_I$, as describe above, which, in turn, allows estimation of an inertia speed phase time. Based upon the given inputs, an estimated inertia speed phase time can be estimated. Values of the initial $N_I$ delta in the look-up table can span positive and negative values, allowing for different calibrations according to upshifts and downshifts.

Figure 9:
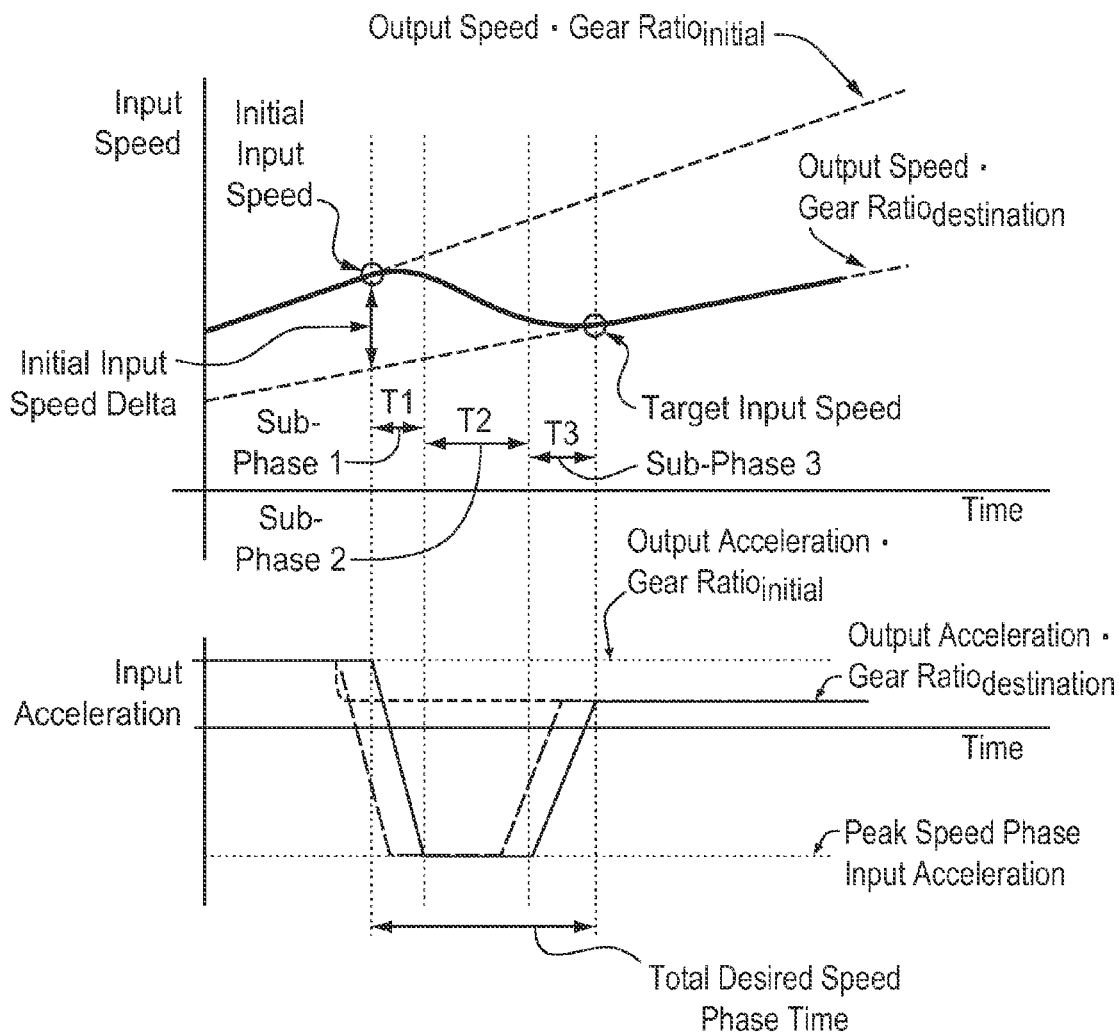
FIG. 9 describes an exemplary inertia speed phase divided into three sub-phases, in accordance with the present disclosure.

Once behavior of $N_I$ at the initiation of the inertia speed phase, behavior of a target $N_I$ based upon a desired operating range state, and a total desired speed phase time are established, a transition described by a input acceleration immediate profile can be described. As will be appreciated based upon any comparison of $N_I$ values versus time, wherein different operating range states have different projections of $N_I$ based upon $N_O$, as is described by the dotted lines in the $N_I$ portions of FIG. 7, inertia speed phase $N_I$ curves are likely to take an S-shape, with transient sub-phases transitioning to and from the initial and target $N_I$ and $N_{I\_DOT}$ values and a center sub-phase linking the sub-phases. By dividing an inertia speed phase into three sub-phases, necessary transitions to an input acceleration immediate profile can be described. FIG. 9 describes an exemplary inertia speed phase divided into three sub-phases, in accordance with the present disclosure. Sub-phase 1 describes a transition from the initial $N_I$ and $N_{I\_DOT}$ values. A time $T_1$ for the sub-phase 1 or a first phase can be calculated through the following equation:

$$T_1 = K_1 * \text{TotalDesiredSpeedPhaseTime} \tag{2}$$

wherein $K_1$ is a calibration between zero and one describing a desired behavior of $N_I$. $K_1$ can be a variable term, set by indications of the context of powertrain operation describing required properties of the shift, or $K_1$ can be a fixed calibrated value. Sub-phase 3 describes a transition to the target $N_I$ and $N_{I\_DOT}$ values. A time $T_3$ for the sub-phase 3 or a third phase can be calculated through the following equation:

$$T_3 = K_3 * \text{TotalDesiredSpeedPhaseTime} \tag{3}$$

wherein K3 is a calibration between zero and one describing a desired behavior of $N_I$ and can be set by methods similar to $K_1$. Sub-phase 2 describes a transition between sub-phases 1 and 3. A time $T_2$ or a second phase, as the remaining portion of the total desired speed phase time to be set after $T_1$ and $T_3$ are defined, can be calculated through the following equation:

$$T_2 = \text{TotalDesiredSpeedPhaseTime} - T_1 - T_3 \tag{4}$$

Figure 15:
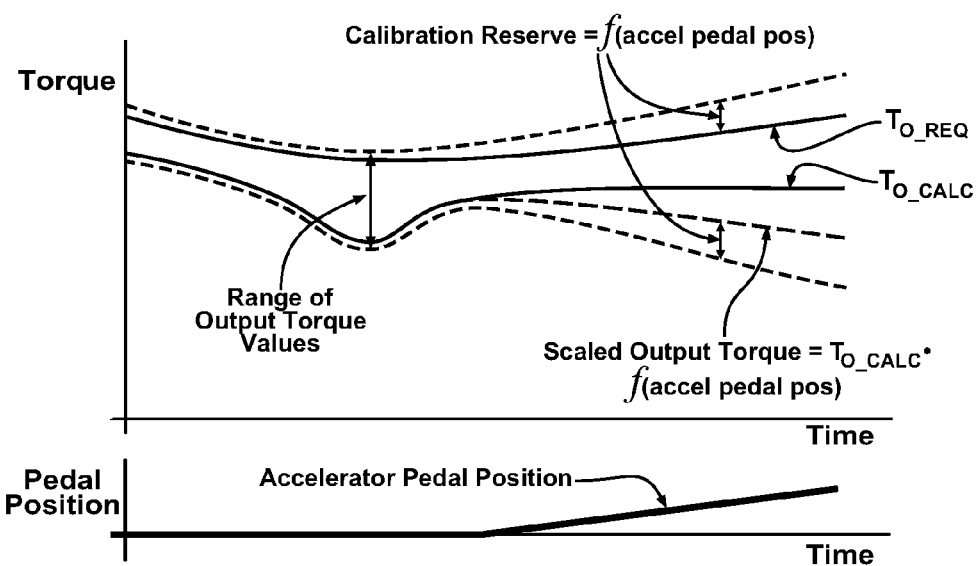
FIG. 15 graphically depicts an exemplary method to determine minimum and maximum desired output torques in a stable EVT mode based upon a requested output torque and a calculated output torque, including widening the resulting range between the requested output torque and the calculated output torque according to foot pedal position, in accordance with the present disclosure.

Sub-phase 2 is depicted as a straight line in the exemplary data of FIG. 15. It will be appreciated that a curved transition can be defined in the sub-phase 2 region depending upon the total desired speed phase time and the behavior of the exemplary powertrain. However, a straight line as depicted can be preferable. The slope of the $N_I$ curve in sub-phase 2 describes the peak speed phase input acceleration that must be achieved in order to accomplish the desired inertia speed phase in the total desired speed phase time. In the exemplary method where $N_{I\_DOT}$ through sub-phase 2 is a constant value, this peak speed phase input acceleration can be calculated through the following equations:

$$PeakSpeedPhaseInputAccel. = \frac{K_\alpha * (N_{I\_TARGET} - N_{I\_INIT})}{TotalDesiredSpeedPhaseTime} + K_\beta \quad [5]$$

$$K_\alpha = \frac{1}{1 - \frac{K_1}{2} - \frac{K_3}{2}} \quad [6]$$

$$K_\beta = K_\alpha * \frac{K_1}{2} \quad [7]$$

By describing behavior of $N_{I\_DOT}$ required through stages of the inertia speed phase, an input acceleration immediate profile can be defined to operate $N_I$ changes in an inertia speed phase.

As described above, reaction times in engines to control commands tend to be slow relative to reaction times of other components of a powertrain. As a result, engine commands issued to an engine simultaneously to an input acceleration immediate profile would include a resulting lag in changes to $N_I$. Instead, a method is additionally disclosed, wherein an input acceleration lead immediate profile is defined based upon a lead period describing the reaction time of the engine. Such a lead period can be the same lead period as calculated in Equation 1 above or can be calculated separately based upon the specific behavior of the engine in an inertia speed phase. For instance, because there is no direct implication of electric machine operation in $N_{I\_DOT}$, the lead period for the input acceleration lead immediate profile can include a factor for an electric machine helping to change $N_{I\_DOT}$ more quickly than the engine could in isolation. The input acceleration lead immediate profile depicted in FIG. 7 includes a portion of the lead profile before the start of the inertia speed phase. In the case of a shift from a fixed gear state, wherein after a shift is initiated, an unlocking event in an off-going clutch must occur, the time period during the unlocking event provides a period wherein commands can be issued to the engine in advance of a desired change in $N_I$. This lead in advance of the inertia speed phase is beneficial in maintaining inertia speed phases to a total desired speed phase time, in accordance with the determinations described above. In circumstance where no or an insufficient lead period is available to allow an input acceleration lead immediate profile to effect engine changes according to the input acceleration immediate profile, an adjustment can be made to the inertia speed phase to compensate for the reaction time of the engine and the resulting lag in changes to $N_I$. Circumstances where no lead is possible includes a shift starting from an exemplary EVT mode, wherein only one clutch is initially engaged, and the inertia speed phase can start immediately upon command. In such a circumstance, the initiation of the inertia speed phase can be delayed after commands are issued to the engine in accordance with the determined lead time.

Figure 10:
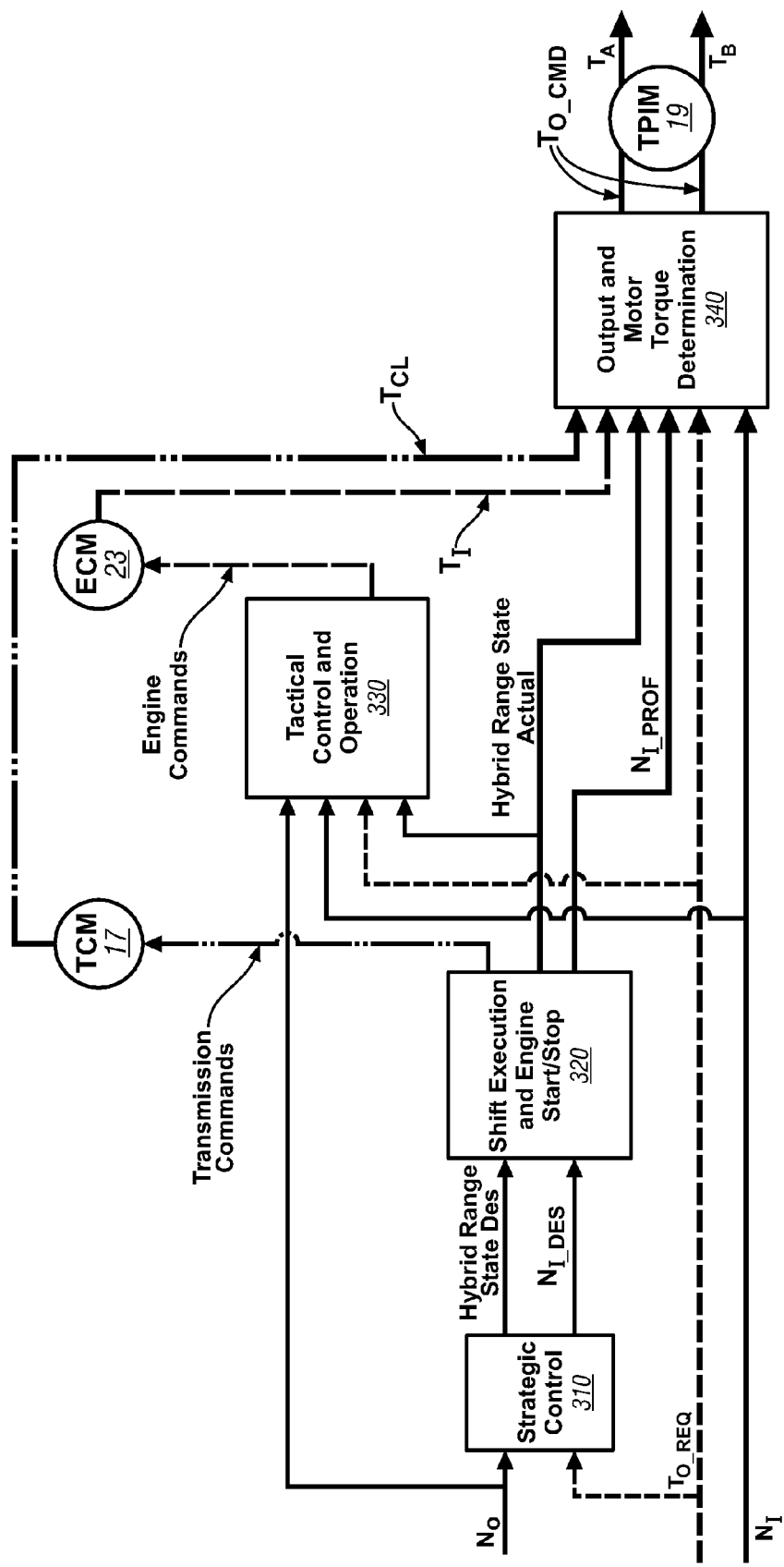
FIG. 10 shows an exemplary control system architecture for controlling and managing torque and power flow in a powertrain system having multiple torque generative devices and residing in control modules in the form of executable algorithms and calibrations, in accordance with the present disclosure.

FIG. 10 shows a control system architecture for controlling and managing torque and power flow in a powertrain system having multiple torque generative devices, described herein below with reference to the hybrid powertrain system shown in FIGS. 1 and 2, and residing in the aforementioned control modules in the form of executable algorithms and calibrations. The control system architecture can be applied to any powertrain system having multiple torque generative devices, including, e.g., a hybrid powertrain system having a single electric machine, a hybrid powertrain system having multiple electric machines, and non-hybrid powertrain systems.

The control system architecture of FIG. 10 depicts a flow of pertinent signals through the control modules. In operation, the operator inputs to the accelerator pedal 113 and the brake pedal 112 are monitored to determine the operator torque request ('$T_{O\_REQ}$'). Operation of the engine 14 and the transmission 10 are monitored to determine the input speed ('$N_I$') and the output speed ('$N_O$'). A strategic optimization control scheme ('Strategic Control') 310 determines a preferred input speed ('$N_{I\_DES}$') and a preferred engine state and transmission operating range state ('Hybrid Range State Des') based upon the output speed and the operator torque request, and optimized based upon other operating parameters of the hybrid powertrain, including battery power limits and response limits of the engine 14, the transmission 10, and the first and second electric machines 56 and 72. The strategic optimization control scheme 310 is preferably executed by the HCP 5 during each 100 ms loop cycle and each 25 ms loop cycle.

The outputs of the strategic optimization control scheme 310 are used in a shift execution and engine start/stop control scheme ('Shift Execution and Engine Start/Stop') 320 to command changes in the transmission operation ('Transmission Commands') including changing the operating range state. This includes commanding execution of a change in the operating range state if the preferred operating range state is different from the present operating range state by commanding changes in application of one or more of the clutches C1 70, C2 62, C3 73, and C4 75 and other transmission commands. The present operating range state ('Hybrid Range State Actual') and an input speed profile ('$N_{I\_PROF}$') can be determined. The input speed profile is an estimate of an upcoming input speed and preferably comprises a scalar parametric value that is a targeted input speed for the forthcoming loop cycle. The engine operating commands and the operator torque request are based upon the input speed profile during a transition in the operating range state of the transmission.

A tactical control scheme ('Tactical Control and Operation') 330 is repeatedly executed during one of the control loop cycles to determine engine commands ('Engine Commands') for operating the engine, including a preferred input torque from the engine 14 to the transmission 10 based upon the output speed, the input speed, and the operator torque request and the present operating range state for the transmission. The engine commands also include engine states including one of an all-cylinder operating state and a cylinder deactivation operating state wherein a portion of the engine cylinders are deactivated and unfueled, and engine states including one of a fueled state and a fuel cutoff state.

A clutch torque ('$T_{CL}$') for each clutch is estimated in the TCM 17, including the presently applied clutches and the non-applied clutches, and a present engine input torque ('$T_I$') reacting with the input member 12 is determined in the ECM 23. A motor torque control scheme ('Output and Motor Torque Determination') 340 is executed to determine the preferred output torque from the powertrain ('$T_{O\_CMD}$'), which includes motor torque commands ('$T_A$', '$T_B$') for controlling the first and second electric machines 56 and 72 in this embodiment. The preferred output torque is based upon the estimated clutch torque(s) for each of the clutches, the present input torque from the engine 14, the present operating range state, the input speed, the operator torque request, and the input speed profile. The first and second electric machines 56 and 72 are controlled through the TPIM 19 to meet the preferred motor torque commands based upon the preferred output torque. The motor torque control scheme 340 includes algorithmic code which is regularly executed during the 6.25 ms and 12.5 ms loop cycles to determine the preferred motor torque commands.

Figure 11B:
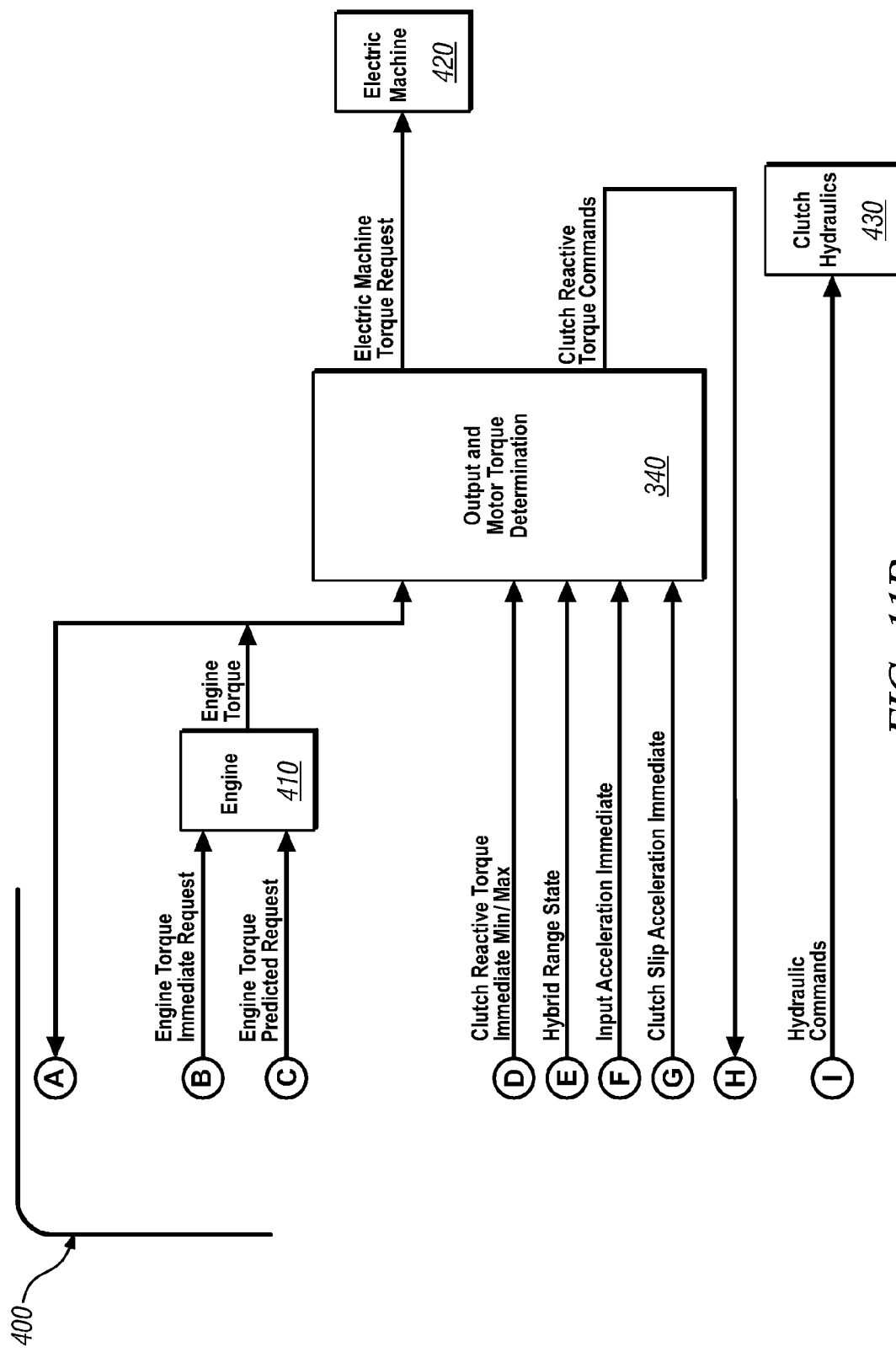
FIG. 11 is a schematic diagram exemplifying data flow through a shift execution, describing more detail exemplary execution of the control system architecture of FIG. 10 in greater detail, in accordance with the present disclosure.

FIG. 11 is a schematic diagram exemplifying data flow through a shift execution, describing more detail exemplary execution of the control system architecture such as the system of FIG. 10 in greater detail, in accordance with the present disclosure. Powertrain control system 400 is illustrated comprising several hybrid drive components, including an engine 410, an electric machine 420, and clutch hydraulics 430. Control modules strategic control module 310, shift execution module 450, clutch capacity control module 460, tactical control and operation module 330, output and motor torque determination module 340, and clutch control module 490, are illustrated, processing information and issuing control commands to engine 410, electric machine 420, and clutch hydraulics 430. These control modules can be physically separate, can be grouped together in a number of different control devices, or can be entirely performed within a single physical control device. Module 310, a strategic control module, performs determinations regarding preferred powertrain operating points and preferred operating range states as described in FIG. 10. Module 450, a shift execution module, receives input from strategic control module 310 and other sources regarding shift initiation. Module 450 processes inputs regarding the reactive torque currently applied to the clutch and the preferred operating range state to be transitioned to. Module 450 then employs an algorithm, determining parameters for the execution of the shift, including hybrid range state parameters describing the balance of input torques required of the torque providing devices, details regarding a target input speed and input acceleration lead predicted required to execute the transition to the preferred operating range state, an input acceleration lead immediate as previously described, and clutch reactive torque lead immediate min/max and clutch reactive torque immediate min/max values as previously described. From module 450, clutch reactive torque parameters and hybrid range state information are fed to clutch capacity control module 460, lead control parameters and signals are fed to tactical control and operation module 330, and immediate control parameters and signals are fed to output and motor torque determination module 340. Clutch capacity control module 460 processes reactive torque and hybrid range state information and generates logic describing clutch reactive torque limits enabling engine control through module 330, electric machine control through module 340, and clutch control through module 490, in accordance with methods described herein. Tactical control and operation module 330 includes means to issue torque requests and execute limits upon input torque supplied from engine 410, and feed, additionally, describe the input torque supplied from the engine to module 340 for use in control of electric machine 420. Output and motor torque determination module 340 likewise receives and processes information to issue electric machine torque requests to electric machine 420. Additionally, module 340 generates clutch reactive torque commands for use by clutch control module 490. Module 490 processes information from module 340 and issues hydraulic commands in order to achieve the required clutch torque capacity required to operate the transmission. This particular embodiment of data flow illustrates one possible exemplary process by which a vehicular torque generative devices and related clutches can be controlled in accordance with the method disclosed herein. It will be appreciated by one having ordinary skill in the art that the particular process employed can vary, and this disclosure is not intended to limited to the particular exemplary embodiment described herein.

When a powertrain is operated in a fixed gear operating range state, $N_I$ is a function of $N_O$. Under this fixed relationship, no active control of $N_I$ independent of $N_O$ is possible. Under a variable relationship of $N_I$ to $N_O$, for example in a transmission operating range state wherein $N_I$ and $N_O$ can be controlled independently, such as is described in relation to EVT Mode I and Mode II above, $N_I$ can vary compared to a fixed $N_O$ profile. Operation in EVT modes can be in either transient or stable. Transient EVT mode operation occurs when a synchronous shift is performed, for example, in an inertia speed phase, as described above, in order to transition $N_I$ from an initial speed to a target speed for the purpose of facilitating a synchronous shift. Stable EVT mode operation occurs with the powertrain operating at or tracking to a calibrated optimal mode input speed. Priorities within the operation of the powertrain through these EVT modes depend upon whether the operation is transient or stable.

As described above, maintaining a stable $T_O$ and tracking $T_{O\_REQ}$ are important to drivability. Interruptions or instabilities in $T_O$ result in jerky operation of the powertrain. Failures to closely track $T_{O\_REQ}$ results in poor powertrain performance. Also as described above, control of $N_{I\_DOT}$ is important to orderly and efficient transmission shifts. Additionally, as $N_I$ is directly related to engine speed, control of $N_{I\_DOT}$ impacts drivability, protection of components sensitive to $N_I$, and satisfaction of the operator. While control of $T_O$ and $N_{I\_DOT}$ are sometimes compatible, depending upon powertrain operation, control of these two properties can be in competition. $T_O$ and $N_{I\_DOT}$ can be related to powertrain operation through the following equation:

$$\begin{bmatrix} T_O \\ N_{I\_DOT} \end{bmatrix} = [K_1] \begin{bmatrix} T_A \\ T_B \\ T_{I\_ACT} \\ N_{O\_DOT} \end{bmatrix} \quad [8]$$

$T_{I\_ACT}$ is a determined actual $T_I$ based upon engine operation. A method is disclosed to prioritize between $T_O$ and $N_{I\_DOT}$ based upon powertrain operation.

While operating in a transient EVT mode, an input acceleration profile is generated in order to control the engine to a target speed within a given desired shift time. Input acceleration can be prioritized, emphasizing tracking an input speed profile through the shift event, while still protecting powertrain performance by defining ranges of $T_O$ values through the shift and defining an input acceleration profile based upon the ranges of $T_O$ values.

Figure 12:
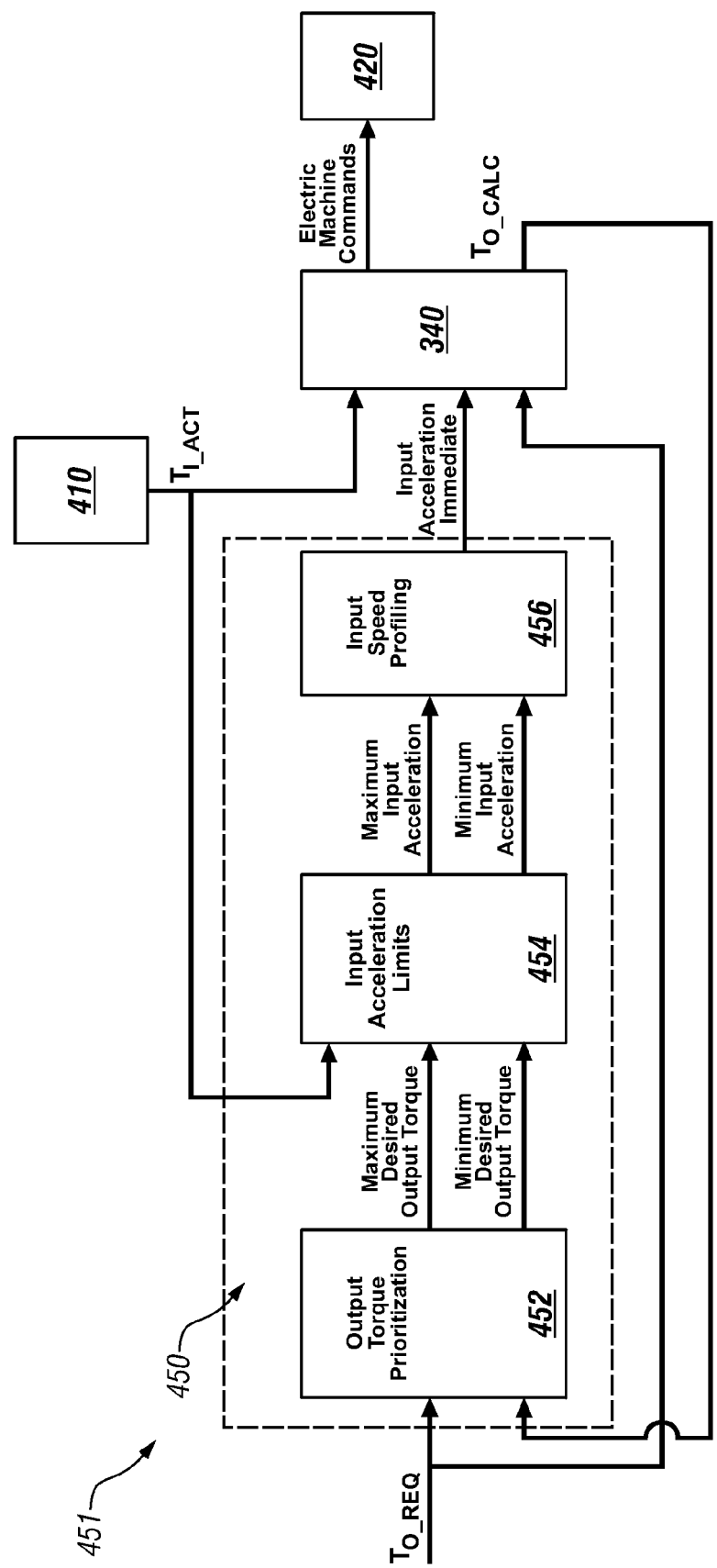
FIG. 12 is a schematic diagram exemplifying data flow through a control system, determining an input acceleration profile through a transient EVT mode, in accordance with the present disclosure.

FIG. 12 is a schematic diagram exemplifying data flow through a control system, determining an input acceleration profile through a transient EVT mode, in accordance with the present disclosure. Information flow 451 comprises a shift execution module 450, output and motor torque determination module 340, engine 410, and electric machine 420. Inputs regarding input and output torques are monitored by shift execution module 450, and an input acceleration immediate profile is determined in order to execute a transmission shift. Output and motor torque determination module 340 receives the input acceleration profile as an input, and along with input regarding $T_{I\_ACT}$ and $T_{O\_REQ}$, issues control commands to electric machine 420. Additionally, module 340 provides a determined output torque ('$T_{O\_CALC}$'). Shift execution module 450 comprises an output torque prioritization module 452, an input acceleration limits module 454, and an input speed profiling module 456. $T_{O\_REQ}$ is input to shift execution module 450, and $T_{I\_ACT}$ and $T_{O\_CALC}$ are fed back within information flow 451 to shift execution module 450. Output torque prioritization module 452 monitors $T_{O\_REQ}$ and $T_{O\_CALC}$ and outputs ranges of $T_O$ values in the form of a maximum desired output torque and a minimum desired output torque. These minimum and maximum desired output torques and $T_{I\_ACT}$ are monitored by input acceleration limits module 454, and minimum and maximum input accelerations are determined. These minimum and maximum input accelerations are input to input speed profiling module 456, and the input acceleration immediate profile is developed based upon the minimum and maximum input accelerations. In this way, a range of $T_O$ values can be defined and utilized to constrain an input acceleration profile.

Figure 13:
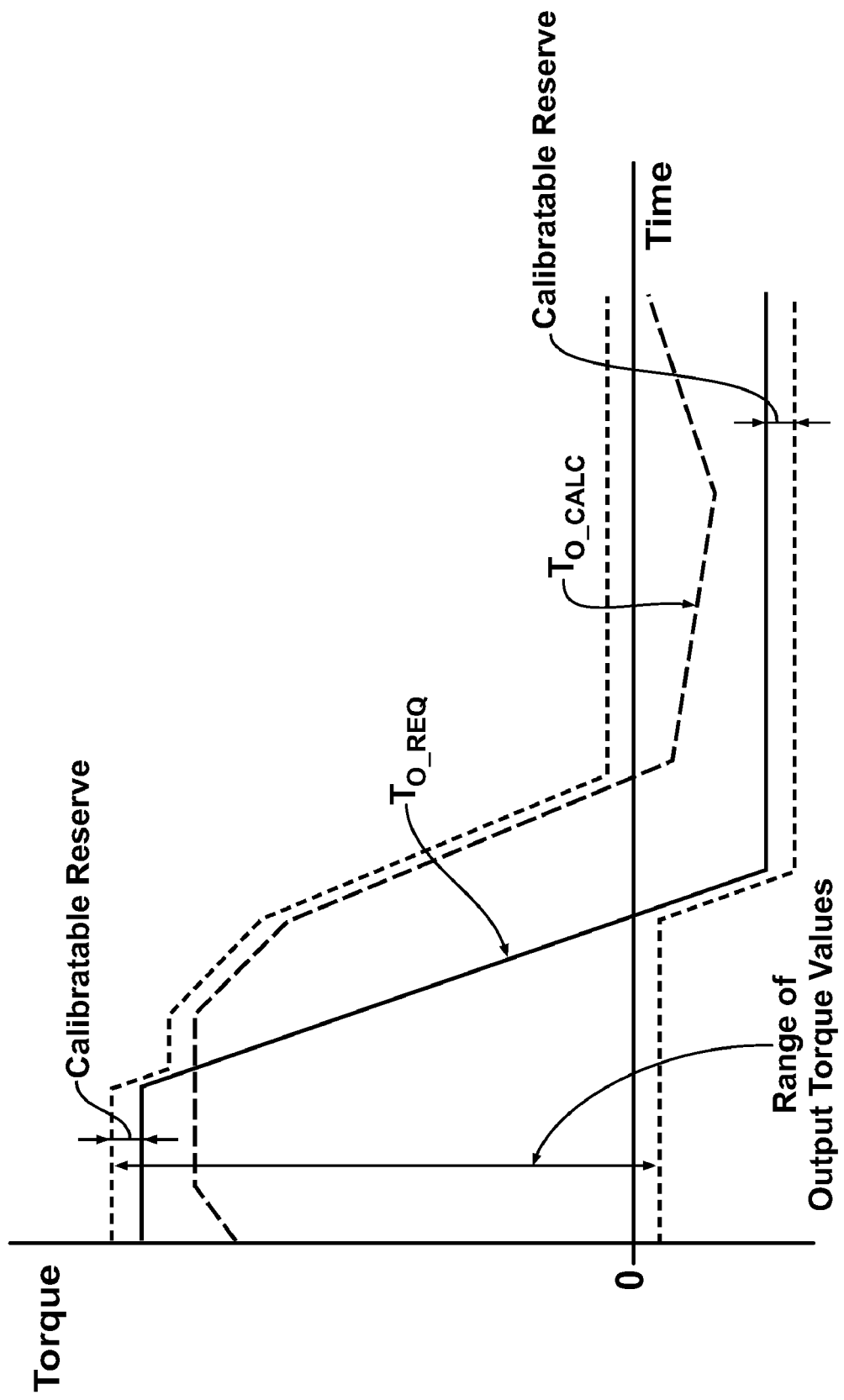
FIG. 13 graphically illustrates an exemplary application of minimum and maximum input acceleration values upon an input acceleration profile, in accordance with the present disclosure.

The exemplary information flow of FIG. 12 describes $T_{O\_REQ}$ and $T_{O\_CALC}$ being used as inputs to output torque prioritization module 452 in order to develop minimum and maximum desired output torques. FIG. 13 graphically illustrates an exemplary method in a transient EVT mode to determine minimum and maximum desired output torques based upon $T_{O\_REQ}$ and $T_{O\_CALC}$, in accordance with the present disclosure. $T_{O\_REQ}$ is depicted, including an initially positive value transitioning to a smaller magnitude, negative value. $T_{O\_CALC}$, describing a determined actual output torque generated by the powertrain, is also depicted, describing To through the depicted time span. Minimum and maximum desired output torque values, according to this exemplary method, are defined according to the maximum of $T_{O\_REQ}$, $T_{O\_CALC}$, and zero and the minimum of $T_{O\_REQ}$, $T_{O\_CALC}$, and zero. The method also includes permissible inclusion of a calibratable reserve in torque added to both the minimum and maximum values. The range of output torque values, for a transient EVT mode, can therefore be expressed by the following equations:

$$T_{O\_DESIRED\_MAX} = \text{MAX}(T_{O\_REQ}, T_{O\_CALC}, 0) + \text{CalibratableReserve} \quad [9]$$

$$T_{I\_DESIRED\_MIN} = \text{MIN}(T_{O\_REQ}, T_{O\_CALC}, 0) - \text{CalibratableReserve} \quad [10]$$

Figure 14:
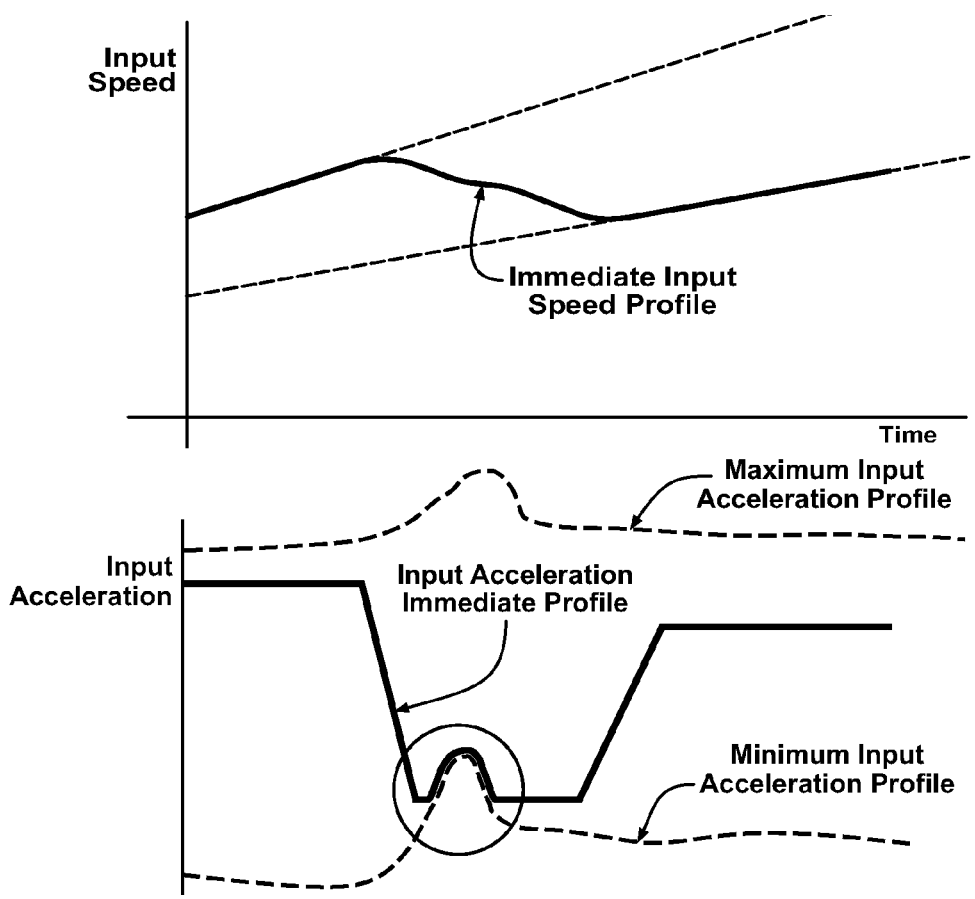
FIG. 14 graphically illustrates an exemplary application of minimum and maximum input acceleration values upon an input acceleration profile, in accordance with the present disclosure.

Based upon an range of output torque values, as expressed by the minimum and maximum desired output torques, constraints upon input acceleration can be determined based upon the relationship between $N_{I\_DOT}$ and $T_O$, expressed for example in Equation 8. These constraints upon input acceleration based upon minimum and maximum desired output torques can define boundaries, within which input acceleration can be controlled without causing $T_O$ to violate the minimum and maximum desired output torques. FIG. 14 graphically illustrates an exemplary application of minimum and maximum input acceleration values upon an input acceleration profile, in accordance with the present disclosure. FIG. 14 includes a top portion describing input speed and a bottom portion describing input acceleration against a common timescale. A shift is initiated from one fixed gear state to another. As described above, an inertia speed phase including transient operation in an EVT mode is utilized to change input speed from an initial input speed defined by a initial fixed gear ratio to a target input speed defined by a destination fixed gear ratio and a shift time. An input acceleration immediate profile is developed in order to create the necessary transition in input speeds. Minimum and maximum input acceleration profiles are depicted in the bottom portion of the graph describing constraints upon input acceleration imposed according to methods described herein. When the constraints, such as the minimum input acceleration profile in the exemplary graph, interact with the intended input acceleration immediate profile, the input acceleration immediate is modified according to the constraint. As depicted in the top portion of the graph, this change to input acceleration changes the normal "S-shaped" input speed profile, causing a delay in changes to input speed. As a result, based upon a changing target speed caused by changes in $N_O$ as the shift time increases, the input acceleration immediate profile must be adjusted to compensate. The shift time, in particular the flat portion of the input acceleration profile associated with time $T_2$ described above, is extended such that the transition to the new target speed can be recovered. In this way, constraints upon input acceleration based upon minimum and maximum desired output torques can be imposed, allowing a prioritized input acceleration profile to be enacted while protecting a certain range of $T_O$ values through the shift.

By contrast, while the powertrain operates in a stable EVT mode according to an exemplary control method, $N_I$ is preferably maintained at or tracked to an optimal input speed. However, operating in a stable EVT mode condition, delivering $T_O$ based upon $T_{O\_REQ}$ can be prioritized within reasonable limits over maintaining $N_I$ at the optimal input speed. The exemplary information flow of FIG. 12 can be utilized in a stable EVT mode to utilize ranges of $T_O$ values to determine an input acceleration profile. The process differs in a stable EVT mode from a transient EVT mode in the defining of the range in $T_O$ values in the information flow, for example, the processing occurring within exemplary module 452. Described above, an range of $T_O$ values for a transient EVT mode is described including minimum and maximum desired output torque values including $T_{O\_REQ}$, $T_{O\_CALC}$, and zero as likely defining boundaries to the range. This wide range of $T_O$ values results in a wide range of input acceleration values fitting between resulting minimum and maximum input acceleration values. For a stable EVT mode, a range of $T_O$ values is instead described including minimum and maximum desired output torque values based upon only $T_{O\_REQ}$ and $T_{O\_CALC}$. The space between $T_{O\_REQ}$ and $T_{O\_CALC}$ and a calibratable reserve above and below the range set by $T_{O\_REQ}$ and $T_{I\_CALC}$, for example, can define a range of $T_O$ values for use in setting input acceleration constraints. This resulting narrower band of $T_O$ values, in comparison to the range defined for a transient EVT mode wherein a zero torque level is included, results in more narrow resulting minimum and maximum input acceleration values. While input speed and input accelerations in a stable EVT mode remain configured to the calibrated optimal input speed for the EVT mode, interaction with the minimum and maximum input accelerations can move input speed away from the optimal input speed in order to prioritize $T_O$. As mentioned above, $N_I$ and $N_{I\_DOT}$ can vary from the optimal input speed in this way in order to prioritize $T_O$, but a measure of reasonable deviation for $N_I$ can be enforced. For example, a band of allowable input speeds above and below the optimal input speed can be adopted. In the alternative, a minimum and maximum input speed in the EVT mode can be enforced based upon preferential operation in that EVT mode. Additionally, static minimum and maximum input acceleration limits can be defined to describe how much input acceleration can change based upon $T_O$, limiting how much input speed and input acceleration can be sacrificed in order to prioritize $T_O$.

The above described exemplary method to define a range of $T_O$ values for use in a stable EVT mode defines a band based upon $T_{O\_REQ}$ and $T_{O\_CALC}$. However, one having ordinary skill in the art will appreciate that $T_O$ in a driving condition changes with foot pedal position. Greater depression of foot pedal position describes a greater expectation for changes in powertrain operation. As a result, greater range of input acceleration terms can foreseeably be required to support the greater expectation for changes in powertrain operation. A wider range of $T_O$ values in response to foot pedal position generating a wider range of allowable input acceleration values between the minimum and maximum input accelerations can be beneficial. Such a result can be achieved by widening the range of $T_O$ values based upon foot pedal position. This widening can be accomplished, for example, by modulating or expanding $T_{O\_CALC}$ away from $T_{O\_REQ}$ based upon foot pedal position. Additionally, widening of the range of $T_O$ values can be accomplished by expanding the calibrated reserves added to the range set by $T_{O\_REQ}$ and $T_{O\_CALC}$. The minimum and maximum desired output torque values for a stable EVT mode, including terms to widen the resulting range according to foot pedal position, can be expressed by the following equations:

$$T_{O\_MAX\_DESIRED} = \text{MAX}(T_{O\_REQ}, (T_{O\_CALC} * \text{CalibratableScalar})) + \text{CalibratableReserve} \quad [11]$$

$$T_{O\_MIN\_DESIRED} = \text{MIN}(T_{O\_REQ}, (T_{O\_CALC} * \text{CalibratableScalar})) - \text{CalibratableReserve} \quad [12]$$

$$\text{Calibratable Scalar} = f(\text{Foot Pedal Position}) \quad [13]$$

$$\text{Calibratable Reserve} = f(\text{Foot Pedal Position}) \quad [14]$$

FIG. 15 graphically depicts an exemplary method to determine minimum and maximum desired output torques in a stable EVT mode based upon $T_{O\_REQ}$ and $T_{O\_CALC}$, including widening the resulting range between $T_{O\_REQ}$ and $T_{O\_CALC}$ according to foot pedal position, in accordance with the present disclosure. The graph includes a top portion, depicting torque terms, and a bottom portion, depicting accelerator pedal position, depicted against a common timeline. $T_{O\_REQ}$ and $T_{O\_CALC}$ are depicted illustrating torque requested through the timeline and resulting output torque. As described above, a range of $T_O$ values is defined including the range between $T_{O\_REQ}$ and $T_{O\_CALC}$ and calibratable reserves above and below $T_{O\_REQ}$ and $T_{O\_CALC}$. When the pedal position is at zero, the resulting range of $T_O$ values defined by $T_{O\_REQ}$ and $T_{O\_CALC}$ and the calibratable reserves is unaffected. However, as the accelerator pedal is depressed, both $T_{O\_CALC}$ and the calibratable reserves are modulated to widen the range of $T_O$ values. Resulting minimum and maximum input acceleration values will correspondingly include a greater range of input acceleration values therebetween. In this way, a widening of a range of $T_O$ values based on foot pedal position and utilized to define input acceleration constraints can be determined.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. A method for controlling a powertrain comprising an electro-mechanical transmission mechanically-operatively coupled to an internal combustion engine and an electric machine adapted to selectively transmit mechanical power to an output member, wherein a microprocessor performs the following steps:
    operating said transmission in an operating range state wherein an input speed of an input shaft of said transmission can operate independently of an output speed of said output member and wherein a reactive torque is transmitted through said transmission;
    monitoring commands affecting a requested output torque;
    monitoring a calculated output torque;
    determining said operation of said transmission to comprise one of stable operation and transient operation;
    if said operation comprises stable operation, controlling said engine and said electric machine based upon said commands affecting said requested output torque; and
    if said operation comprises transient operation,
        determining a permissible range of output torque values based upon said commands affecting said requested output torque and said calculated output torque;
        determining an input acceleration immediate command for controlling acceleration of said input shaft based upon said permissible range; and
        controlling said engine and said electric machine based upon said input acceleration immediate command.

2. The method of claim 1, wherein
    determining said permissible range is further based upon a zero output torque value.

3. The method of claim 2, wherein
    determining said input acceleration immediate command comprises:
    determining a minimum input acceleration and a maximum input acceleration based upon said permissible range; and
    determining said input acceleration immediate command based upon said minimum input acceleration and said maximum input acceleration.

4. The method of claim 3, wherein determining said input acceleration immediate command based upon said minimum input acceleration and said maximum input acceleration comprises:
    determining an input acceleration profile based upon said minimum input acceleration and said maximum input acceleration.

5. The method of claim 2, wherein
    determining said permissible range is further based upon calibratable reserves located at either end of said permissible range.

6. The method of claim 1, wherein determining said permissible range includes calibratable reserves which are scaled based upon an accelerator pedal position.

7. The method of claim 1, wherein determining said permissible range includes scaling said calculated output torque based upon an accelerator pedal position.

8. The method of claim 1, wherein determining said operation of said transmission to comprise one of stable operation and transient operation comprises:
    monitoring a command to shift said transmission; and
    determining said operation to comprise transient operation based upon a required change in speed of said input shaft corresponding to said command to shift said transmission.

9. A method for controlling a powertrain comprising an electro-mechanical transmission mechanically-operatively coupled to an internal combustion engine and an electric machine adapted to selectively transmit mechanical power to an output member, wherein a microprocessor performs the following steps:

operating said transmission in an operating range state wherein an input speed of an input shaft of said transmission can operate independently of an output speed of said output member and wherein a reactive torque is transmitted through said transmission;

monitoring commands affecting a requested output torque;

monitoring a calculated output torque;

determining said operation of said transmission to comprise one of stable operation and transient operation;

if said operation comprises stable operation, controlling said engine and said electric machine based upon said commands affecting said requested output torque; and if said operation comprises transient operation, determining a permissible range of output torque values based upon a minimum value and a maximum value selected from said commands affecting said requested output torque, said calculated output torque, and a zero output torque value;

determining an input acceleration immediate command for controlling acceleration of an input shaft of said transmission based upon said permissible range; and controlling said engine and said electric machine based upon said input acceleration immediate command.

10. An apparatus for controlling a powertrain comprising an electro-mechanical transmission mechanically-operatively coupled to an internal combustion engine and an electric machine adapted to selectively transmit mechanical power to an output member, the apparatus comprising:

said transmission including a gear configuration operating in an operating range state wherein input speed can operate independent of output speed and wherein a reactive torque is transmitted through said transmission; and a shift execution module, including a microprocessor configured to perform the following steps to monitor commands affecting a requested output torque, monitor a calculated output torque, determine said operation of said transmission to comprise one of stable operation and transient operation;

if said operation comprises stable operation, control said engine and said electric machine based upon said commands affecting said requested output torque; and if said operation comprises transient operation, determine a permissible range of output torque values based upon said commands affecting said requested output torque and said calculated output torque;

determine an input acceleration immediate command for controlling acceleration of an input shaft of said transmission based upon said permissible range; and control said engine and said electric machine based upon said input acceleration immediate command.

11. The apparatus of claim 10, wherein said microprocessor configured to perform the step to determine said permissible range further comprises the microprocessor configured to perform a step to determine said permissible range further based upon a zero output torque value.

12. The apparatus of claim 11, wherein the microprocessor configured to perform the step to determine said input acceleration immediate command comprises:

the microprocessor configured to perform a step to determine a minimum input acceleration and a maximum input acceleration based upon said permissible range; and the microprocessor configured to perform a step to determine said input acceleration immediate command based upon said minimum input acceleration and said maximum input acceleration.

13. The apparatus of claim 10, wherein said logic to determine a permissible range includes logic to modulate said calculated output torque based upon an accelerator pedal position.

\* \* \* \* \*